US010178855B2

(12) United States Patent
Holmstrom

(10) Patent No.: US 10,178,855 B2
(45) Date of Patent: Jan. 15, 2019

(54) RETRACTABLE LEASH SYSTEM

(71) Applicant: Eric James Holmstrom, Riverside, CA (US)

(72) Inventor: Eric James Holmstrom, Riverside, CA (US)

( * ) Notice: Subject to any disclaimer, the term of this patent is extended or adjusted under 35 U.S.C. 154(b) by 0 days.

(21) Appl. No.: 15/345,442

(22) Filed: Nov. 7, 2016

(65) Prior Publication Data

US 2017/0071162 A1    Mar. 16, 2017

Related U.S. Application Data

(62) Division of application No. 15/179,844, filed on Jun. 10, 2016, which is a division of application No. (Continued)

(51) Int. Cl.
| | |
|---|---|
| *A01K 27/00* | (2006.01) |
| *B25G 1/06* | (2006.01) |
| *B25G 1/10* | (2006.01) |
| *B65H 75/38* | (2006.01) |
| *B65H 75/44* | (2006.01) |

(52) U.S. Cl.
CPC .......... *A01K 27/004* (2013.01); *A01K 27/008* (2013.01); *B25G 1/06* (2013.01); *B25G 1/102* (2013.01); *B65H 75/38* (2013.01); *B65H 75/4428* (2013.01)

(58) Field of Classification Search
CPC ..... A01K 27/003; A01K 27/004; A01K 27/00
USPC ................................ 119/794, 795, 796, 797; 242/405.1–405.3
See application file for complete search history.

(56) References Cited

U.S. PATENT DOCUMENTS

| 3,123,052 A | 3/1964 | Marshall |
|---|---|---|
| 4,197,817 A | 4/1980 | Crutchfield |
| (Continued) | | |

FOREIGN PATENT DOCUMENTS

WO    2005025303 A1    3/2005

OTHER PUBLICATIONS

United States Patent & Trademark Office, Ex Parte Quayle Office Action issued in related U.S. Appl. No. 13/542,649 dated Apr. 13, 2016, 13 pages.

(Continued)

*Primary Examiner* — Lisa L Tsang

(57) ABSTRACT

An animal restraint system which involves variable adjustability of maximum extension. A braking device with a pivoting tip which can move from a neutral position to a locked engaged position, a disengaged position, and a semi-engaged position. The semi-engaged position allows for spool rotation in the direction of retraction, while preventing spool rotation in the direction of extension. A brake lock with multiple settings including engaged position, disengaged position, and a semi-engaged position. A spool with teeth where one or more of the teeth is different from the others in shape, size or relative position to promote brake engagement efficiency. A leash maximum settings display. A moving "leash" guide which reduces tangling during extension and retraction. An adjustable handle grip to accommodate different hand sizes. A snap-on accessory attachment system. A leash dispenser system which limits full extension to reduce system failure.

19 Claims, 20 Drawing Sheets

Related U.S. Application Data

13/542,649, filed on Jul. 10, 2012, now Pat. No. 9,480,241.

(60) Provisional application No. 61/571,707, filed on Jul. 5, 2011, provisional application No. 61/627,646, filed on Oct. 17, 2011.

(56) References Cited

U.S. PATENT DOCUMENTS

| | | | |
|---|---|---|---|
| 4,961,544 A | 10/1990 | Bidoia | |
| 5,558,044 A * | 9/1996 | Nasser, Jr. | A01K 27/006 119/796 |
| 5,839,394 A * | 11/1998 | Dickison | A01K 27/005 119/795 |
| 5,857,261 A | 1/1999 | Li | |
| 6,148,773 A | 11/2000 | Bogdahn | |
| 6,293,485 B1 | 9/2001 | Hollowed | |
| 6,523,500 B1 | 2/2003 | Zenteno | |
| 6,694,922 B2 | 2/2004 | Walter et al. | |
| 6,886,499 B2 | 5/2005 | Meissner | |
| 6,904,872 B2 | 6/2005 | Muller | |
| 6,938,667 B2 | 9/2005 | Sugiyama et al. | |
| 7,040,257 B2 | 5/2006 | Waxman et al. | |
| 7,150,247 B2 * | 12/2006 | Eulette | A01K 27/004 119/796 |
| 7,168,393 B2 | 1/2007 | Bogdahn et al. | |
| 7,896,281 B2 | 3/2011 | Bleshoy | |
| 8,151,736 B2 | 4/2012 | Simpson et al. | |
| 8,695,537 B2 | 4/2014 | Bizzell et al. | |
| 8,826,865 B2 | 9/2014 | Bogdahn et al. | |
| 9,480,241 B2 | 11/2016 | Holmstrom | |
| 2006/0162675 A1 * | 7/2006 | Ghalebi | A01K 27/004 119/796 |
| 2007/0204805 A1 | 9/2007 | Brody | |
| 2008/0105214 A1 | 5/2008 | Moulton | |
| 2008/0230015 A1 | 9/2008 | Bleshoy | |
| 2008/0276882 A1 | 11/2008 | Bogdahn | |
| 2009/0114759 A1 | 5/2009 | Bogdahn | |
| 2011/0073047 A1 | 3/2011 | Simpson et al. | |
| 2011/0146592 A1 | 6/2011 | Friedrichsen | |
| 2011/0163195 A1 | 7/2011 | Bentz et al. | |
| 2011/0220036 A1 | 9/2011 | Matthews | |
| 2011/0239956 A1 | 10/2011 | Bogdahn | |
| 2012/0006284 A1 | 1/2012 | Messner | |
| 2012/0205479 A1 | 8/2012 | Wang | |
| 2012/0234959 A1 | 9/2012 | Christianson et al. | |
| 2013/0008392 A1 | 1/2013 | Holmstrom | |
| 2016/0278345 A1 | 9/2016 | Holmstrom | |

OTHER PUBLICATIONS

U.S. Appl. No. 15/365,769, Non-Final Office Action dated May 29, 2018.
U.S. Appl. No. 15/345,442, Final Office Action dated Apr. 24, 2018.
U.S. Appl. No. 15/345,442, Non-Final Office Action dated Nov. 1, 2017.
U.S. Appl. No. 15/179,844, Final Office Action dated Mar. 27, 2018.
U.S. Appl. No. 15/179,844, Non-Final Office Action dated Sep. 25, 2017.
U.S. Appl. No. 15/179,844, Final Office Action dated May 15, 2017.
U.S. Appl. No. 15/179,844, Non-Final Office Action dated Dec. 15, 2016.

\* cited by examiner

RETRACTABLE LEASH SYSTEM

CROSS-REFERENCE TO RELATED APPLICATIONS

This application is a divisional of U.S. patent application Ser. No. 15/179,844 titled "Retractable Leash System." filed Jun. 10, 2016, which is a divisional of U.S. patent application Ser. No. 13/542,649 titled "Retractable Leash System," filed Jul. 10, 2012 and issued as U.S. Pat. No. 9,480,241 on Nov. 1, 2016, which claims benefit of U.S. Provisional Patent Application No. 61/571,707 titled "Adjustable Length Extension/Retraction Leash and Braking System," filed Jul. 5, 2011; and U.S. Provisional Patent Application No. 61/627,646 titled "Adjustable Length Extension/Retraction Leash and Braking System." filed Oct. 17, 2011, the entire contents of which are incorporated herein by reference in their entirety.

TECHNICAL FIELD

The invention relates generally to a retractable leash adjustability system for maximum extension using manual and mechanical brake actuation, a braking system with multiple settings, an adjustable handle and grip system, a system to affix leash accessories to the leash housing, and a spool design which facilitates smooth and safe brake actuation.

BACKGROUND OF THE INVENTION

Animal restraints such as leashes or tie-outs for animals, such as dogs, have been designed using fixed length leads, variable length leads, and leads which combine the function of both fixed length and variable length. Fixed length leads are problematic when the pet is not far enough away from the pet owner or a fixed location, resulting in a leash which is loose, not taut, between the end attached to the animal and the opposite end held by the pet owner or attached to a fixed location. The loose lead can get tangled easily around the pet, pet owner or the fixed location. Variable length leashes and tie-outs, often in the form of retractable leashes, are designed with a leash wrapped around a spool within a casing which has a tension spring to allow the leash to extend out from or retract into the casing holding the spool as the pet either moves away from the pet owner or toward the pet owner, thus preventing slack in the leash. Retractable leashes allow for longer length extension than fixed length leashes. Retractable leashes typically have a brake, which, when engaged at a desired length less than full extension capability, prevents further length extension. The engaged brake typically results in a fixed length leash and the aforementioned functional deficiencies. There might be situations related to the size and temperament of the dog, the size and strength of the dog walker, and the safety conditions of the environment, where it is desirable to have a retractable leash which can extend and retract freely up to a length which is less than the full extended length of the leash.

To address the above problem, some retractable leash devices have attempted to provide brake actuating designs with maximum length settings less than full leash extension in order to offer retraction capability for leash lengths less than full leash extension.

All in all, these devices have major disadvantages. Some designs have setting limitations which do not accommodate practical application. Some designs are clumsy in that they require multi-step actuation or two-hand actuation. Another design is cumbersome in that it requires the dog to extend the leash to the desired maximum length and be stopped before the new extension maximum length can be set. In other designs, once the new maximum length has engaged the brake to prevent further extension, the setting cannot be changed, if desired, to a new setting to accommodate a changing situation because the brake locks up the system. In one type of device, either the dog or the pet owner needs to create slack in the leash in order to unlock the setting. This might require the pet owner using the manual brake as a second step. In addition to these limitations, many of these aforementioned designs have structural challenges where is not seen that they can be practically overcome.

Additional challenges relate to handle formation for a safe and comfortable grip. Other leash designs have non-adjustable grips which cannot accommodate varied hand sizes. Some attempts to remedy this include various fixed contour handles, but this one size fits all approach does not work.

Pet owners like to carry a variety of accessories, such as toys, to treats, water and clean-up devices, when walking a pet. Attempts to facilitate carry-along convenience have been limited to hook-on systems which do not affix contents in a rigid manner. The loose nature of these devices affects both comfort and control.

When retractable leashes are in the mode of rapid extension which turns the leash spool inside the housing at a rapid rate, actuating the brake can be problematic because the brake tooth has trouble engaging the turning spool. This problem affects both comfort and control since the brake does not engage immediately and the vibration from lack of engagement is uncomfortable and startling.

When retractable leashes are fully extended and a large force is encountered at the point of full extension, leashes frequently brake because they are designed with a stress point where the leash attaches to the spool or other interior positions. This problem is a safety issue because a broken leash results in a run-away pet.

SUMMARY

A device with functional advantages, which are represented here in the form of a retractable leash and tie-out design, that can be applied beyond the scope featured. A retractable leash and tie-out design, which can be manufactured and manufactured economically, incorporating a system for continuous adjustability settings for maximum leash extension. The design delivers control, safety and comfort with its setting ability to rapidly and easily accommodate specific or changing situations related to the size and temperament of the dog, the size and strength of the dog walker, and the safety conditions of the environment. Settings for a child walking a dog can be quite different than for that of an adult. Furthermore, the safety of the environment can change rapidly including other people, other pets, or surroundings. Ease of adjustability and setting flexibility enhance the control, safety and comfort of walking a pet. Brake actuation can be either manual or by use of the adjustable setting device. The setting of the device can take place when the leash is not in use, such as prior to a walk, or when the leash is in use with the brake on, or when the brake is off as the leash is being extended or retracted. The brake can operate independently or in unison with the brake lock to function in a semi-engaged mode where the leash spool is prevented from rotation for further extension, yet can rotate in the direction of retraction. The semi-engaged mode is simple to actuate either manually or by the positioning of the brake lock. The brake lock works in unison with the brake with the ability to be set into three positions, including a disengaged position which does not actuate the brake, a semi-engaged position which prevents the leash spool from rotating in the direction of further extension while allowing rotation in the direction of retraction, and an engaged position which prevents the leash spool from rotating in either the direction of extension or retraction. The leash operator can manually set the leash in semi-engaged mode and comfortably hold the brake button in one position while the pivot brake tip moves into its various positions during extension and retraction.

The compact, lightweight design can be operated with one hand by children and adults alike. The bi-directional pivoting brake tip, with its non-linear arc of engagement and disengagement, delivers a wider range of motion and, with its neutral repositioning system incorporating bi-directional force, it uniquely facilitates consistent operation in the full range of varying operational and braking conditions. In addition to the safety and control that the bi-directional pivoting brake tip delivers, the leash operator also experiences greater comfort from smoother engagement. Other designs simulating elements of the semi-engaged mode either have an inconsistent ready position to function or require constant control management. The incorporation of non-uniform teeth on the leash spool improve control, safety and comfort by delivering quicker and smoother brake engagement by reducing vibration and skipping most noted in other designs when braking during rapid spool rotation during leash extension. The easy-read gauge makes setting the maximum length easy. The adjustable handle and grip provide improved control, safety and comfort to dog walkers with hands of varying sizes. Non-adjustable grips present a one size fits all approach to a device which requires great control in order to be operated safely. The system for affixing accessories enhances the dog walking experience through convenience and comfort. The brake actuating system can offer product reliability and safety even when incorporated into a leash design with no adjustability. In this scenario, the leash can be manufactured to be fully extended without fully unwinding at maximum extension. This prevents the spool from having a single stress point at the point of attachment of the leash to the spool which can fatigue or break when either the end of the leash is reached too often during use, or the leash connection at the spool is challenged by too great of a force of a running dog when the end of the leash is reached.

The features of this preferred embodiment highlight features which are working collectively to enhance performance in the areas of control, safety, comfort and practical design. Each of the features represented enhance the performance of the preferred embodiment presented. Each of the features can stand alone as an enhancement to any leash design. The design features work with various leash materials, including, but not limited to, belt or cord leashes.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE PREFERRED EMBODIMENT

Figure 1:
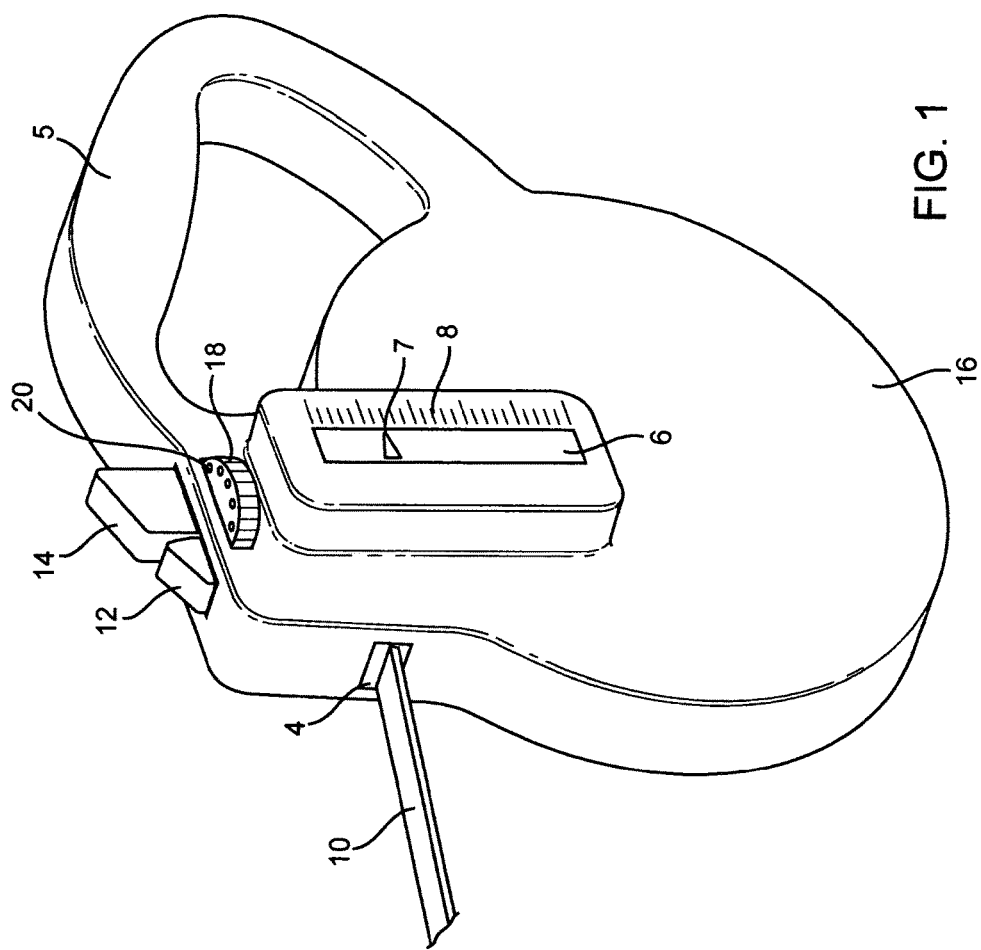
FIG. 1 is a perspective view of the exterior with the adjustable brake actuation system.

According to a first aspect of the present invention, the present invention comprises a retractable retention system having a housing 16, a cord/leash 10, a spool 28 rotatably disposed within the housing 16 and a braking system.

The cord 10 has a proximal portion and a distal portion. Optionally, the proximal portion of the cord 10 can always be wound at least once around the spool 28.

The spool 28 is adapted to retain the cord 10 and can rotate in either a first radial direction 38 or a second radial direction 31. The spool 28 is biased to rotate in the first radial direction 38 which causes the cord 10 to wind around the spool 28. The spool 28 has an outer perimeter with a plurality of spaced apart teeth 24, 26. The plurality of teeth 24, 26 can vary in size, shape and/or spacing.

The braking system prevents the spool 28 from rotating in the second radial direction 31 and comprises a brake engagement element 14 and a brake insert.

The brake engagement element 14 is movably attached to the housing 16 and has an exterior portion and an interior portion.

The brake insert has a base portion and a brake tip portion 11. The base portion of the brake insert is rotatably coupled to the interior portion of the brake engagement element 14 such that the brake tip portion 11 can be rotated in either direction between a first position 34, a second position, and a third position 37. The brake tip 11 is biased to the second position, which is between the first position 34 and the third position 37. The brake insert is adapted such that the brake tip portion 11 can be inserted between the plurality of spaced apart teeth 24, 26 to prevent the rotation of the spool 28 in the second radial direction 31.

Optionally, the braking system can prevent the spool 28 from rotating in the second radial direction 31 and the spool 28 can still freely rotate in the first radial direction 38 thereby maintaining tension on the cord 10.

Optionally, the housing 16 has a handle 5, and the handle 5 can have an adjustable handle grip 80. The adjustable handle grip 80 is capable of moving in a first direction or a second direction relative to the handle 5 to accommodate different sized users' hands.

In a second aspect of the present invention, the present invention has a housing 16, a cord 10, a spool 28 rotatably disposed within the housing 16, a braking system, and a cord 10 extension limiting system.

The cord 10 has a proximal portion and a distal portion. Optionally, the proximal portion of the cord 10 can always be wound at least once around the spool 28.

The spool 28 is adapted to retain the cord 10 and can rotate in either a first radial direction 38 or a second radial direction 31. The spool 28 is biased to rotate in the first radial direction 38, which causes the cord 10 to wind around the spool 28. The spool 28 has an outer perimeter with a plurality of spaced apart teeth 24, 26. The plurality of teeth 24, 26 can vary in size, shape and/or spacing.

The braking system prevents the spool 28 from rotating in the second radial direction 31 and comprises a brake engagement element 14 and a brake insert.

The brake engagement element 14 is movably attached to the housing 16 and has an exterior portion and an interior portion. Optionally, the brake engagement element 14 can prevent the spool 28 from rotating in the second radial direction 31 and the spool 28 can still freely rotate in the first radial direction 38 maintaining tension on the cord 10.

The brake insert has a base portion and a brake tip portion 11. The base portion of the brake insert is rotatably coupled to the interior portion of the brake engagement element 14. The brake insert is adapted such that the brake tip portion 11 can be inserted between the plurality of spaced apart teeth 24, 26 to prevent the rotation of the spool 28 in the second radial direction 31.

Optionally, the brake tip portion 11 can be rotated in either direction between a first position 34, a second position, and a third position 37. The brake tip portion 11 is biased to the second position, which is between the first position 34 and the third position 37.

The cord 10 extension limiting system has a stop 76 coupled to the brake engagement element 14 by a stop support 75, and an auger 63 (threaded rod) operatively coupled to the spool 28.

The stop 76 is disposed at a location that prevents full cord 10 extension. The stop support 75 is capable of alternatively moving relative to the housing 16 in a first stop support linear direction and a second stop support linear direction. The first stop support linear direction moves the brake tip portion 11 to between the plurality of spaced apart teeth 24, 26 and the second stop support linear direction moves the brake tip portion 11 away from between the plurality of spaced apart teeth 24, 26. The stop support 75 is biased in the second stop support linear direction.

A brake actuator 69 is threaded onto the auger 63. Rotation of the spool 28 in the first spool radial direction 38 causes the auger 63 to rotate in a first auger radial direction and the rotation of the spool 28 in the second spool radial direction 31 causes the auger 63 to rotate in a second auger radial direction.

Rotation of the auger 63 in the first auger radial direction causes the brake actuator 69 to travel in a first brake actuator linear direction and rotation of the auger 63 in the second auger radial direction causes the brake actuator 69 to travel in a second brake actuator linear direction. The traveling of the brake actuator 69 in the second brake actuator linear direction causes the brake actuator 69 to eventually contact the stop 76. The continued traveling of the brake actuator 69 in the second brake actuator linear direction causes the brake actuator 69 to push the stop 76 and the stop support 75 in the first linear stop support direction. This moves the brake tip portion 11 to between the plurality of spaced apart teeth 24, 26. The traveling of the brake actuator 69 in the first brake actuator linear direction causes the brake actuator 69 to move away from the stop 76 to allow the stop support 75 to travel in the second stop support linear direction. This moves the brake tip portion 11 from between the plurality of spaced apart teeth 24, 26.

In one embodiment of the second aspect, the stop support 75 is provided by an adjustment auger 66 and the stop 68 is threadably attached to the adjustment auger 66.

The adjustment auger 66 is rotatably coupled to the brake engagement element 14 and is capable of alternatively moving relative to the housing 16 in a first adjustment auger linear direction and a second adjustment auger linear direction. The first adjustment auger linear direction moves the brake tip portion 11 to between the plurality of spaced apart teeth 24, 26 and the second adjustment auger linear direction moves the brake tip portion 11 away from between the plurality of spaced apart teeth 24, 26. The adjustment auger 66 is biased in the second adjustment auger linear direction.

Rotation of an adjustment dial 18 in a first adjustment dial radial direction rotates the adjustment auger 66 in a first adjustment auger radial direction and the rotation of the adjustment dial 18 in a second adjustment dial radial direction rotates the adjustment auger 66 in a second adjustment auger radial direction.

Rotation of the adjustment auger 66 in the first adjustment auger radial direction causes the stop 68 to travel along the adjustment auger 66 in a first stop linear direction, and the rotation of the adjustment auger 66 in the second adjustment auger radial direction causes the stop 68 to travel along the adjustment auger 66 in a second stop linear direction.

Optionally, the retractable retention system can also have a meter 8 coupled to the housing 16, the meter 8 comprising a meter guide 7, such that the location of the stop 68 corresponds to the location of the meter guide 7 relative to the meter 8 and the maximum cord 10 extension length.

Additionally, the cord 10 can be alternatively extended 32 and retracted 36 between a fully retracted position and a fully extended position. Prior to use or during use, a maximum extension length of the cord 10 can be selectable by a dial, a slide or pins at an infinite number of extension lengths between the fully retracted position and the fully extended position.

Figure 2:
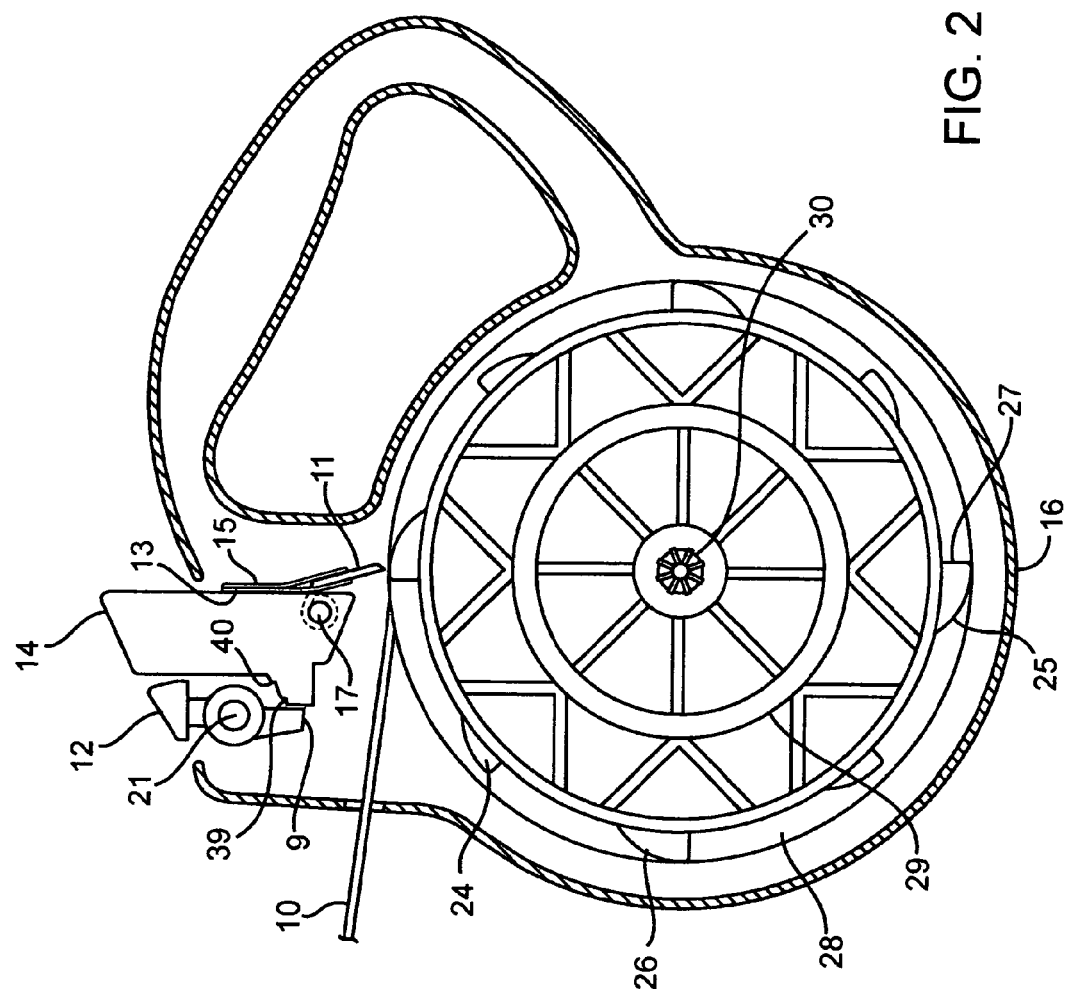
FIG. 2 is a plan view of components inside the housing shown in FIG. 1 with emphasis on the spool, brake, brake tip, bi-directional spring, and brake lock.

The leash assembly for a cord 10 which can be extended and retracted to walk animals, as shown in FIG. 1, comprising a housing 16 with a handle 5 to carry the leash assembly. FIG. 2 reveals housing 16 contains a spool 28 onto which the cord 10 is wound and which leaves the housing 16 through an exit opening 4 shown in FIG. 1. The spool 28 has a set of multiple teeth 26 and 24 located on outside with a corresponding set of teeth on the opposite side of the spool 28. On the opposite side (not shown), the positioning and orientation of the spool teeth are symmetrical and parallel to the view seen in FIG. 2. Furthermore, a brake button 14 is provided in order to block the leash spool 28 and thus form a leash part in any desired length. At its free end, the leash is provided with a connecting hook (not shown). Under a spool plug 29 is a spring (not shown) against whose force the spool 28 can rotate. According to this, the leash assembly corresponds to a normal mechanically retractable leash assembly and needs no further explanation.

Figure 4:
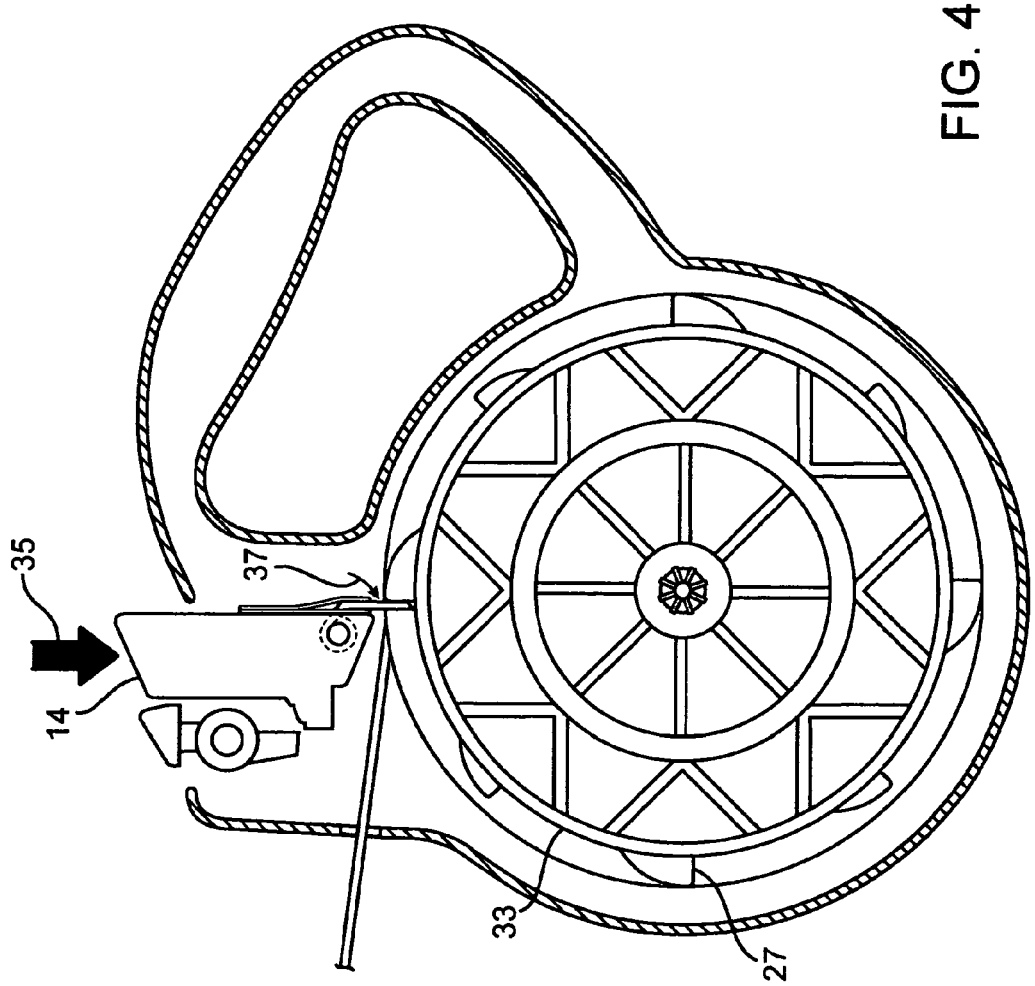
FIG. 4 is a plan view of components inside the housing shown in FIG. 1 with emphasis on the brake, brake tip and bi-directional spring positioned to prevent spool rotation.

The brake button 14 in FIG. 2 is mounted in the leash housing 16 so that it can move inward, as seen by the arrow on FIG. 4 or outward back toward its fully disengaged position as seen in FIG. 2. The movement of the brake button 14 runs approximately radially to the leash spool 28. The bottom part of the brake button 14 is a pivot brake tip 11 which is mounted to the upper portion of brake button 14 using a brake pin 17 which facilitates the pivot brake tip 11 rotational movement. Furthermore, pivot brake tip 11 rests in a neutral position of engagement under the bi-directional force of a bi-directional spring system comprised of a spring force 13 toward an outward disengaged orientation and spring force 15 toward an inward engaged orientation. The opposing spring force 13 and 15 work in unison to hold pivot brake tip 11 in a neutral position when brake button 14 in conjunction with pivot brake tip 11 are fully disengaged from spool 28. From the neutral position of pivot brake tip 11, the tip is capable of rotating either inward or outward as it pivots on brake pin 17.

Figure 3:
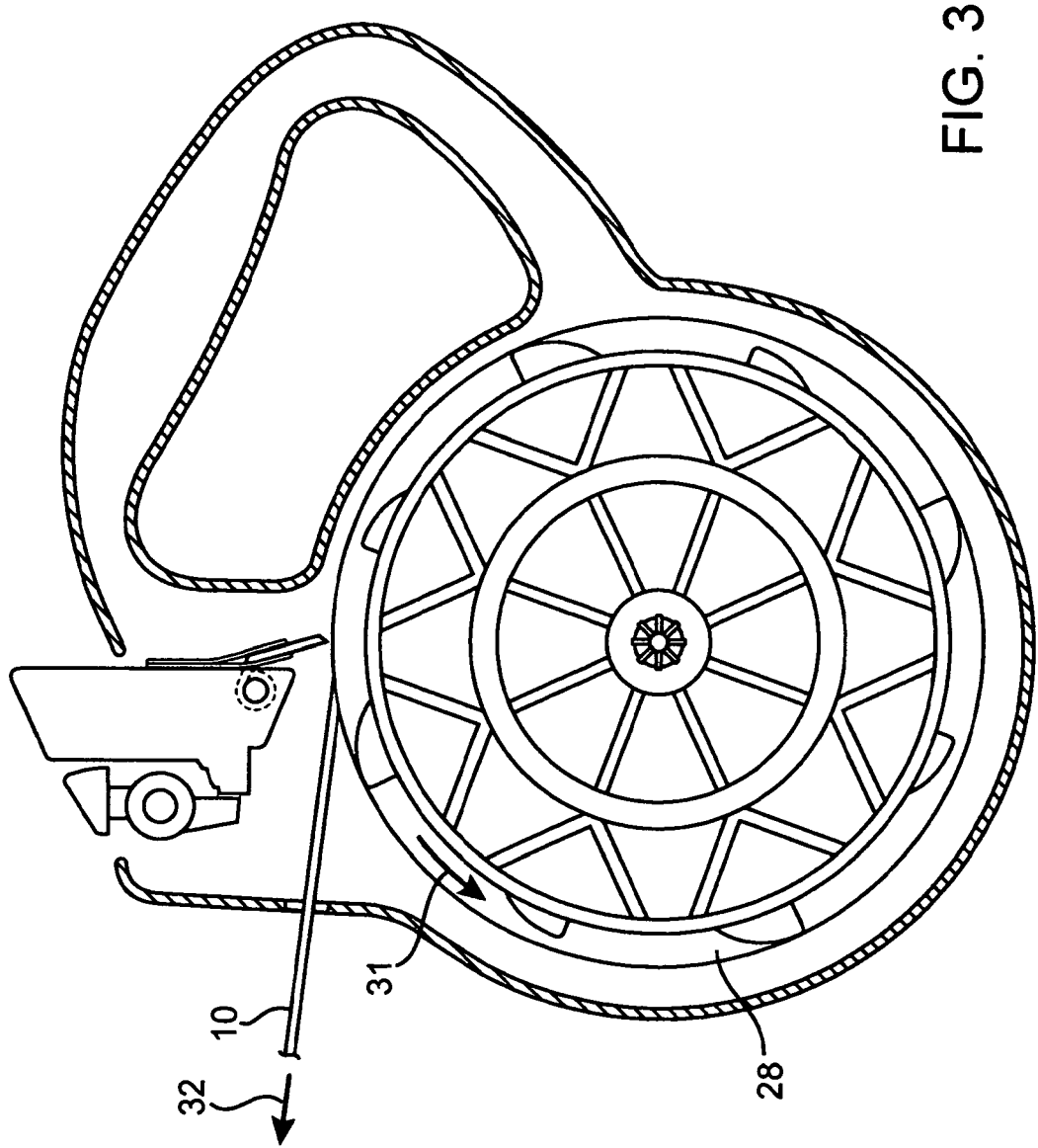
FIG. 3 is a plan view of components inside the housing shown in FIG. 1 with emphasis on illustrating spool rotation in the direction of leash extension.

FIG. 3 shows the leash spool 28 rotating in the direction of arrow 31 during leash 10 extension in the direction of arrow 32 with brake button 14 in FIG. 2 in conjunction with pivot brake tip 11 in FIG. 2 in a fully disengaged position from spool 28.

FIG. 4 demonstrates full brake engagement, when brake button 14 is pushed inward in the direction of arrow 35, pivot brake tip 11 in FIG. 2 contacts one of the spool tooth braking surfaces 27, which are oriented mostly radially from the center of the spool, resulting in brake activation which prevents the spool 28 in FIG. 3 from rotating in either the direction of extension or retraction thus preventing the leash 10 from lengthening or shortening. Pivot brake tip 11, upon contacting spool tooth braking surface 27 during rotation in the direction of extension, rotates inward in the direction of arrow 37 toward a parallel orientation with brake button 14. As pivot brake tip 11 rotates inward, spring force 13 in FIG. 2 is pushed in the direction of force of spring force 15. During full brake engagement, the bottom of pivot tip 11 is in contact with spool tooth braking surface 27 and may or may not make contact with spool rotational surface 33.

Figure 5:
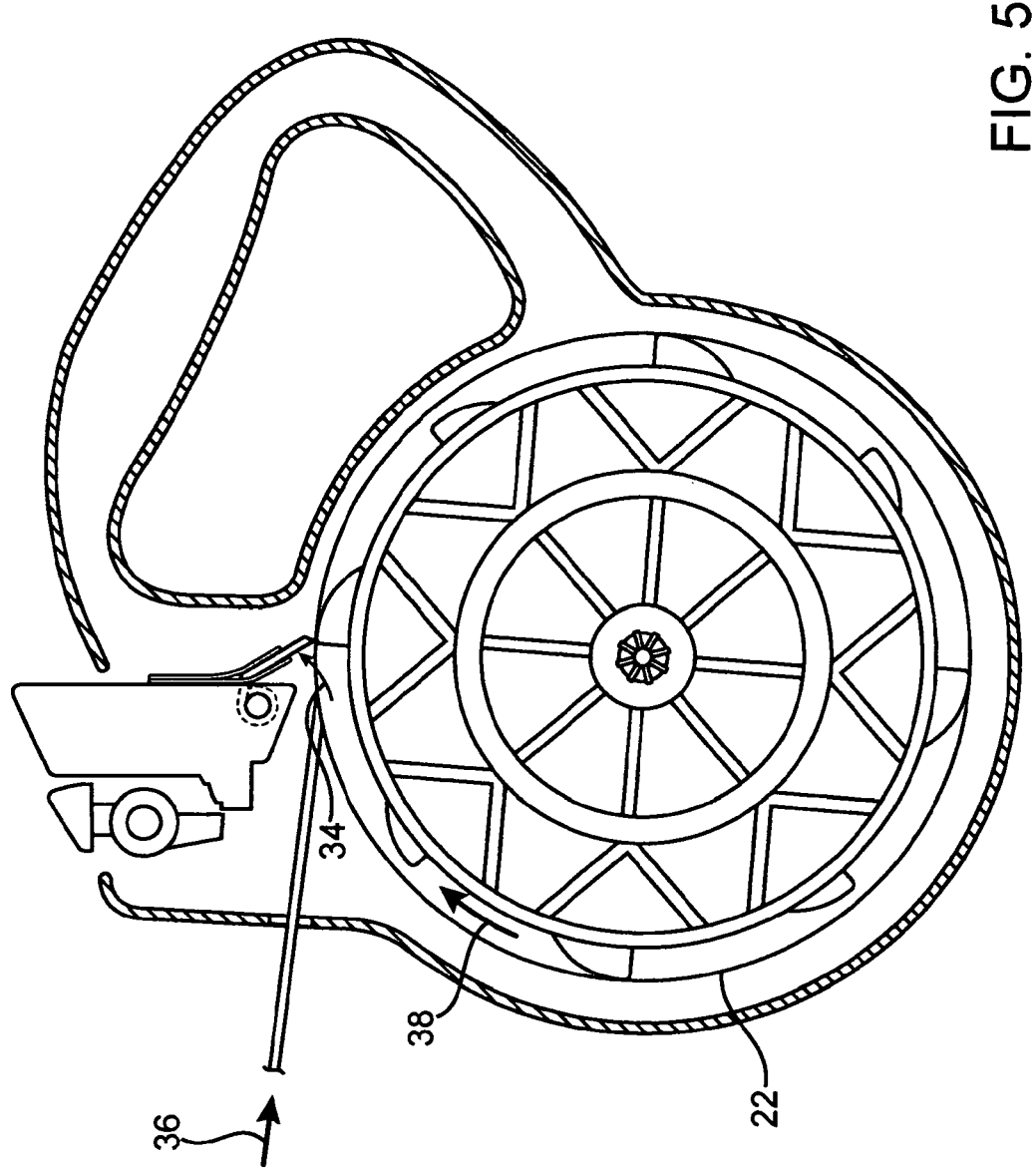
FIG. 5 is a plan view of components inside the housing shown in FIG. 1 with emphasis on the brake, brake tip and bi-directional spring positioned to allow spool rotation in the direction of leash retraction.

FIG. 5 demonstrates semi-brake engagement during which brake button 14 in FIG. 2 in unison with pivot brake tip 11 in FIG. 2 is positioned such that the bottom of pivot brake tip 11 is in contact with spool tooth 26 without being able to contact spool rotational surface 33. When brake button 14 is pushed inward in the direction of arrow 35 in FIG. 4, pivot brake tip 11 in FIG. 2 contacts one of the angled spool tooth surfaces 25, resulting in pivot brake tip 11 rotating outward as seen in arrow 34 from its neutral position. As pivot brake tip 11 rotates outward, spring force 15 in FIG. 2 is pushed in the direction of force of spring force 13. In FIG. 5, spool rotation is in the direction of retraction as seen by arrow 38 causing leash 10 to shorten in the direction of arrow 36. With brake button 14 in unison with pivot brake tip 11 in the position of semi-brake engagement, pivot brake tip 11, upon no longer making contact with spool tooth surface 25, rotates back to its neutral position under spring force 13 and spring force 15 in FIG. 2 which places the bottom of the pivot brake tip between spool outer surface 22 in FIG. 5 and spool rotation surface 33 in FIG. 4. This position allows pivot brake tip to rotate in the direction of arrow 34 during spool rotation in the direction of retraction seen in arrow 38 in FIG. 5, or pivot brake tip 11, upon contact with spool tooth braking surface 27 in FIG. 2 during spool rotation in the direction of extension as seen in arrow 31 of FIG. 3, can rotate in the direction of arrow 37 to assume brake tip orientation as seen in FIG. 4 and prevent spool rotation in the direction of leash extension.

Figure 6:
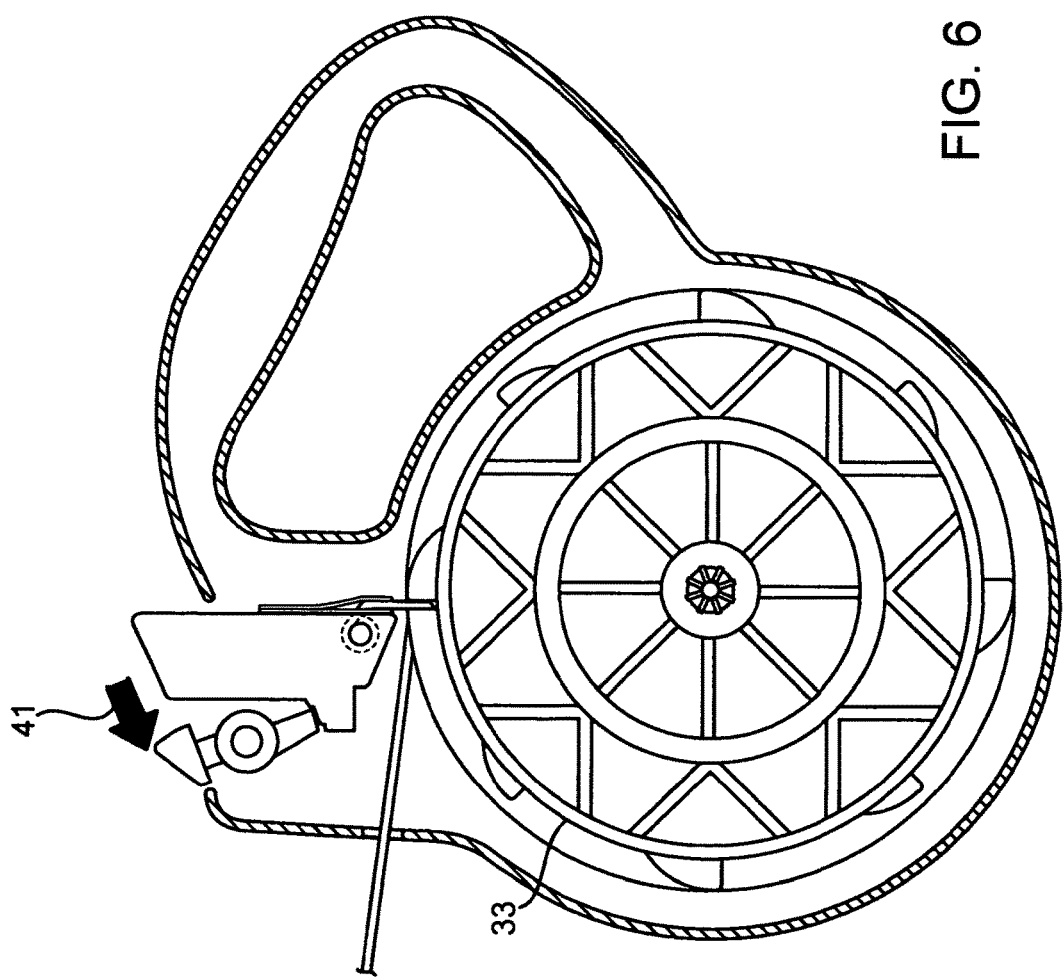
FIG. 6 is a plan view of components inside the housing shown in FIG. 1 with emphasis on the brake, brake tip, bi-directional spring, and brake lock positioned to prevent spool rotation.

In FIG. 6, brake button 14 in unison with pivot brake tip 11 are in the fully engaged position in relation to spool 28 with the bottom of pivot brake tip in contact with both spool tooth braking surface 27 in FIG. 2 and spool rotational surface 33 in FIG. 6 resulting in spool rotation prevention. Brake lock 12 is pivoted on brake pin 21 in FIG. 2 and moved into position in the direction of arrow 41 in FIG. 6 on the top of brake lock 12 where the bottom of brake lock 9 is in contact with brake button notch 40 resulting in brake lock 12 affecting full brake engagement with spool 28. Until brake lock 12 is subsequently moved out of fully engaged position, spool 28 cannot move and leash 10 can neither lengthen nor shorten. Leash 10 is now a fixed length which can end up with slack if the distance between the pet and pet owner is reduced in FIG. 2.

Figure 7:
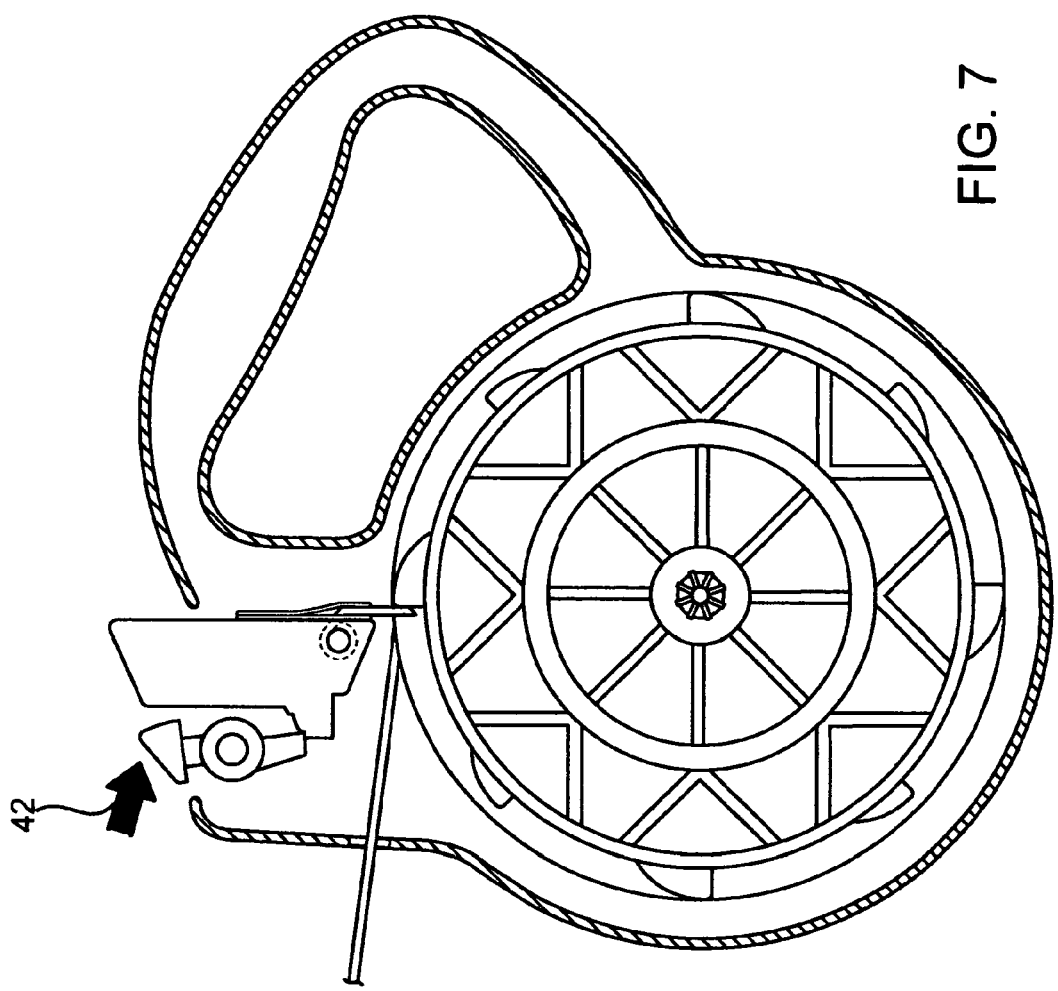
FIG. 7 is a plan view of components inside the housing shown in FIG. 1 with emphasis on the brake, brake tip, bi-directional spring, and brake lock with brake lock alternately positioned to prevent spool rotation in the direction of extension.
Figure 8:
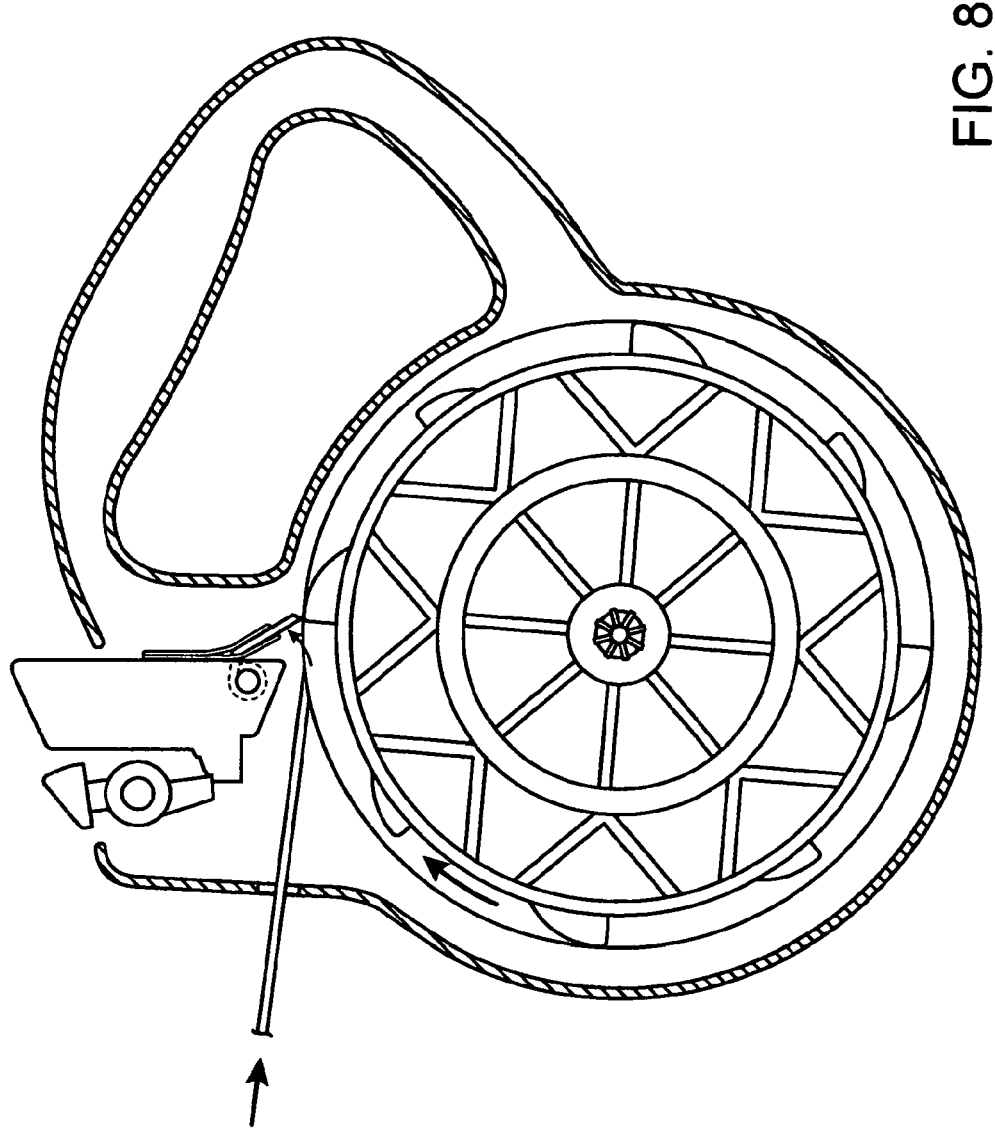
FIG. 8 is a plan view of components inside the housing shown in FIG. 1 with emphasis on the brake, brake tip, bi-directional spring, and brake lock with brake lock alternately positioned, as in FIG. 7, to allow spool rotation in the direction of retraction.

In FIG. 7 and FIG. 8, brake button 14 in unison with pivot brake tip 11 are in the semi-engaged position in relation to spool 28 with the bottom of pivot brake tip in contact with spool tooth braking surface 27 in FIG. 2 and not with spool rotational surface 33 in FIG. 4 resulting in spool rotation prevention in the direction of extension as seen in FIG. 3 arrow 31. Brake lock 12 is pivoted on brake pin 21 in FIG. 2 and moved into position in the direction of arrow 42 in FIG. 7 when brake lock 12 is moved from the fully engaged position, or from the opposite direction after moving brake button 14 in unison with pivot brake tip 11 into semi-engaged position with spool 28. The bottom of the brake lock 9 is in contact with brake button notch 39 resulting in brake lock 12 affecting semi-brake engagement with spool 28. As with brake 14 in unison with pivot brake tip 11 in semi-brake engagement with spool 28 is prevented from rotating in the direction of leash extension while allowing spool rotation in the direction of spool retraction.

Figure 9:
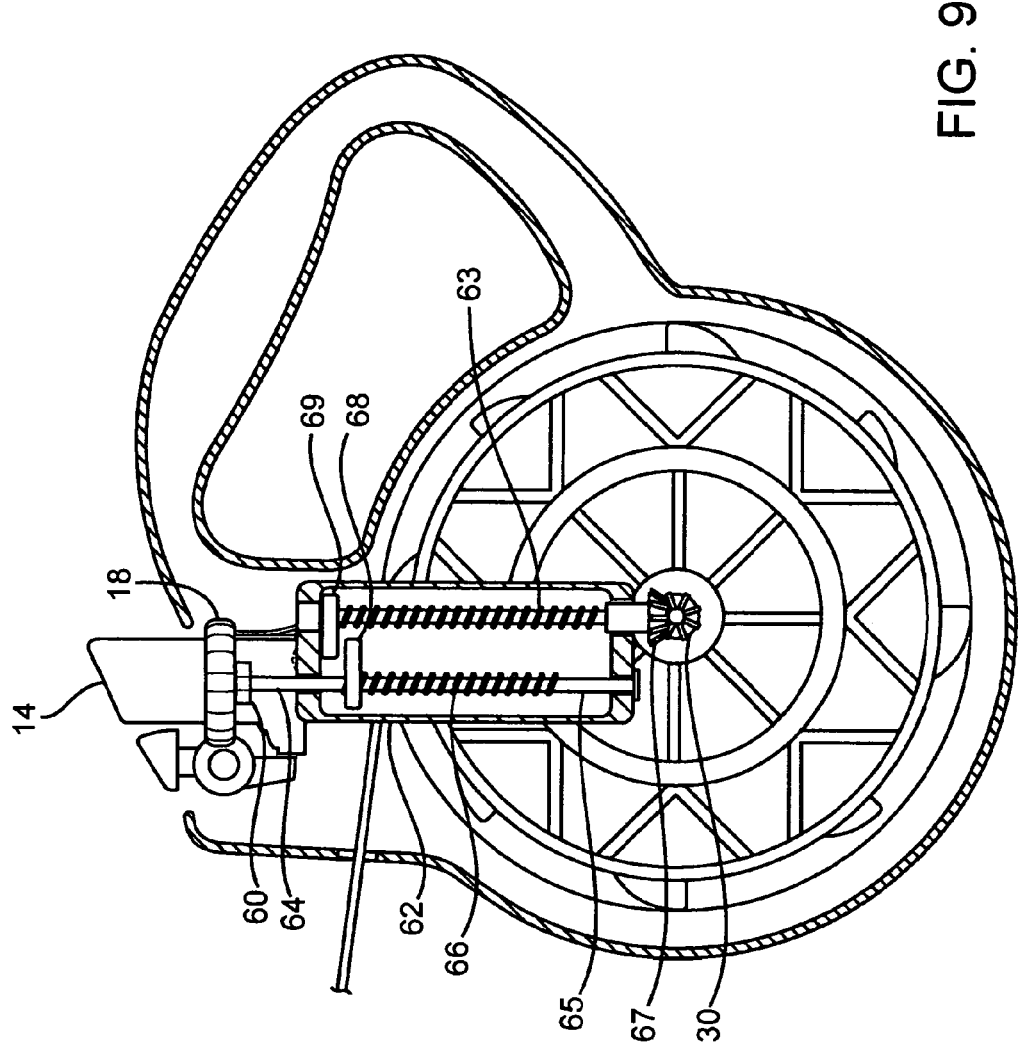
FIG. 9 is a plan view of components inside the housing shown in FIG. 1 with emphasis on the adjustable brake actuation system.
Figure 10:
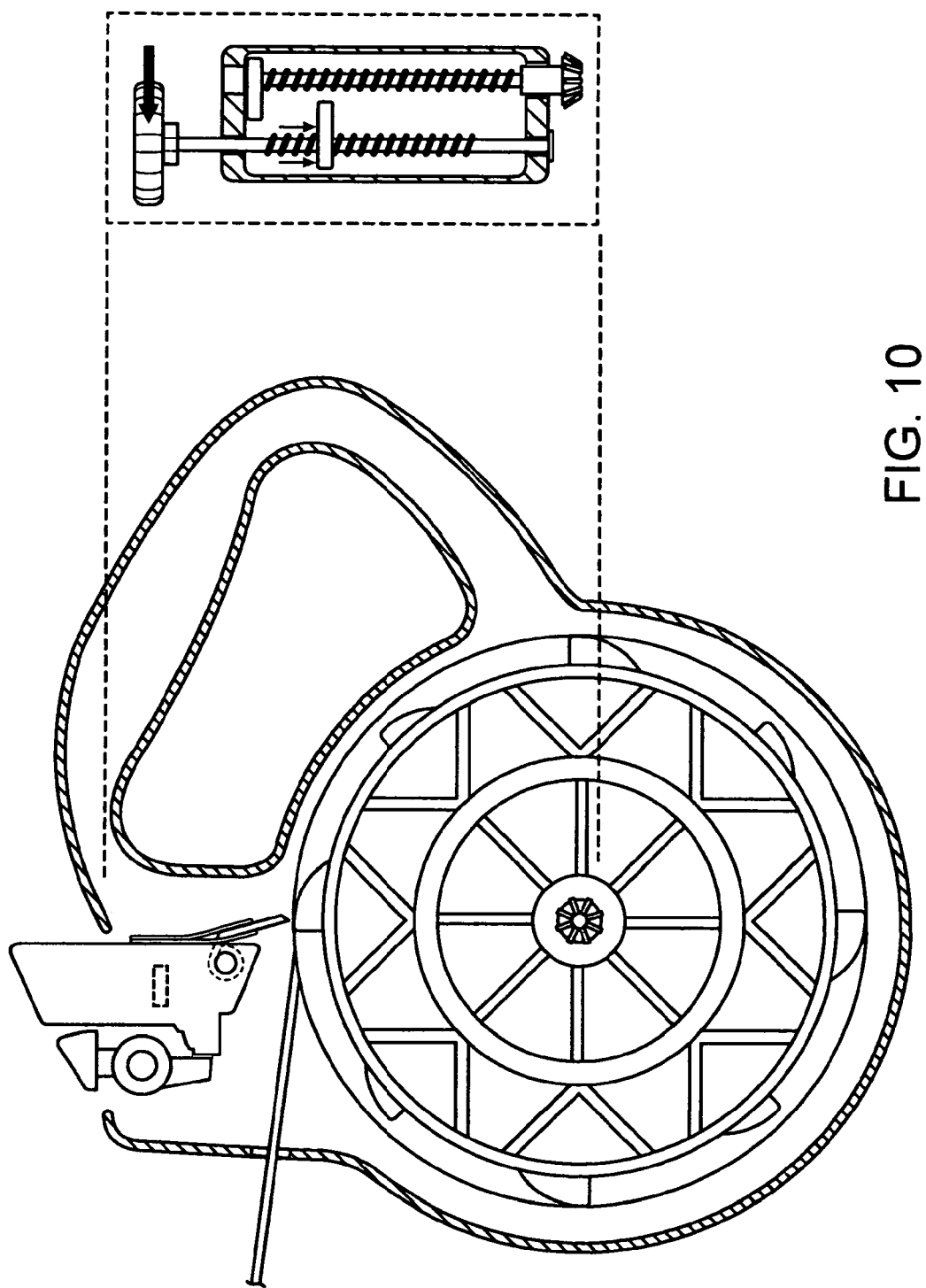
FIG. 10 is a plan view of components inside the housing shown in FIG. 1 with an exploded view of the adjustable brake actuation system and emphasis on the setting of the adjustable brake actuation system.

FIGS. 9-13 are a series of views demonstrating operation elements of the adjustable brake actuation system. The brake actuation system in FIG. 9 demonstrates compact size and energy transfer efficiencies within the leash system which also impact the component integrity during operation. The transfer of energy from spool 28 in FIG. 2 to brake 14 through the brake actuation system is low enough to allow for all components to be made of plastic, if desired, without concerns of design failure. In FIG. 9, housing 62 is connected to housing 16 in FIG. 2. The brake actuation system is linked to brake button 14 at brake mount 60 in FIG. 9. While the brake actuation system can activate the brake without direct linkage, the linkage is used to enhance operational and structural efficiencies.

Adjustment dial 18 directly drives auger 66 and shaft 64. When adjustment dial 18 is rotated in the direction of the arrow shown in FIG. 10, setting stop 68, which is threaded to move along auger 66, moves relationally and directionally as indicated by the arrows. The position of setting stop 68 in FIG. 9 is directly translated to meter guide 7. Meter guide 7 can be viewed through meter window 6 and translated by meter 8. Meter guide 7 is positioned alongside meter 8 in FIG. 1 to designate the adjustment setting and moves in parallel with the meter guide. After adjustment dial 18 is rotated to move setting stop 68 into the position by the pet owner, setting stop 68 remains in position on auger 66 in FIG. 9. FIG. 1 reveals optional dial guides 20 on adjustment dial 18.

Figure 11:
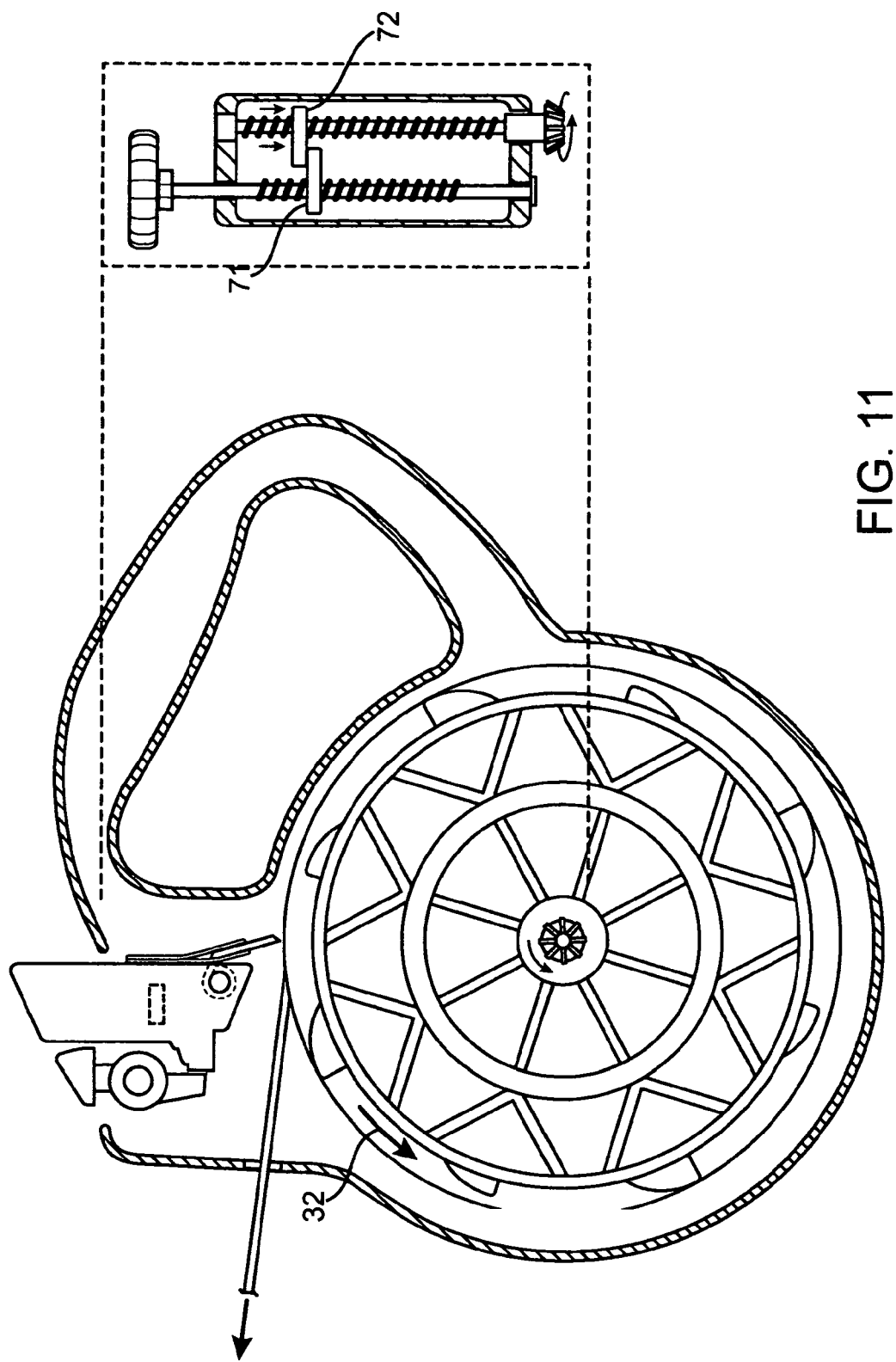
FIG. 11 is a plan view of components inside the housing shown in FIG. 1 with an exploded view of the adjustable brake actuation system and emphasis on the adjustable brake actuation system in motion toward leash extension and at the point of brake engagement.
Figure 12:
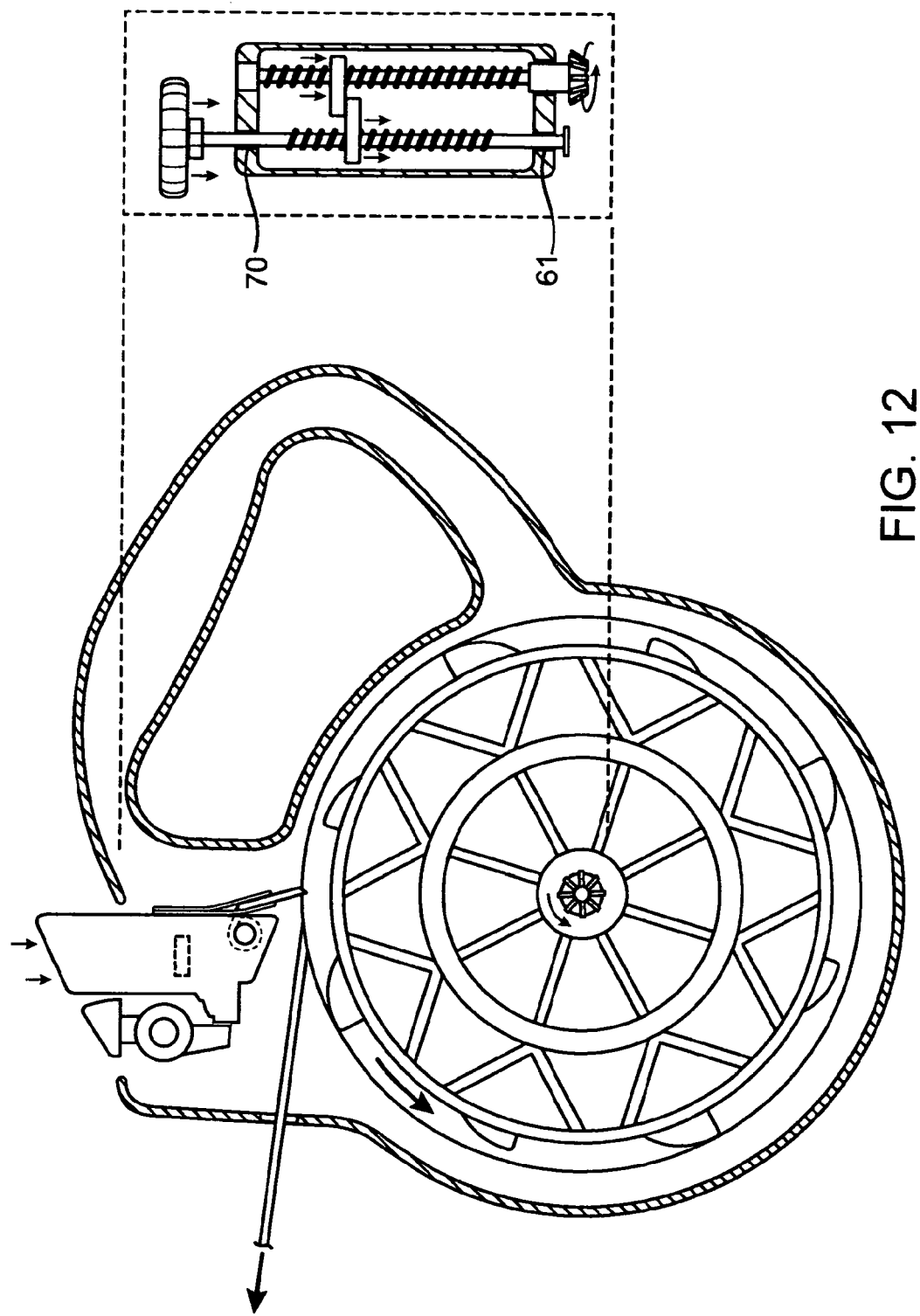
FIG. 12 is a plan view of components inside the housing shown in FIG. 1 with an exploded view of the adjustable brake actuation system and emphasis on the adjustable brake actuation system in motion toward leash extension with brake engagement in process.
Figure 13:
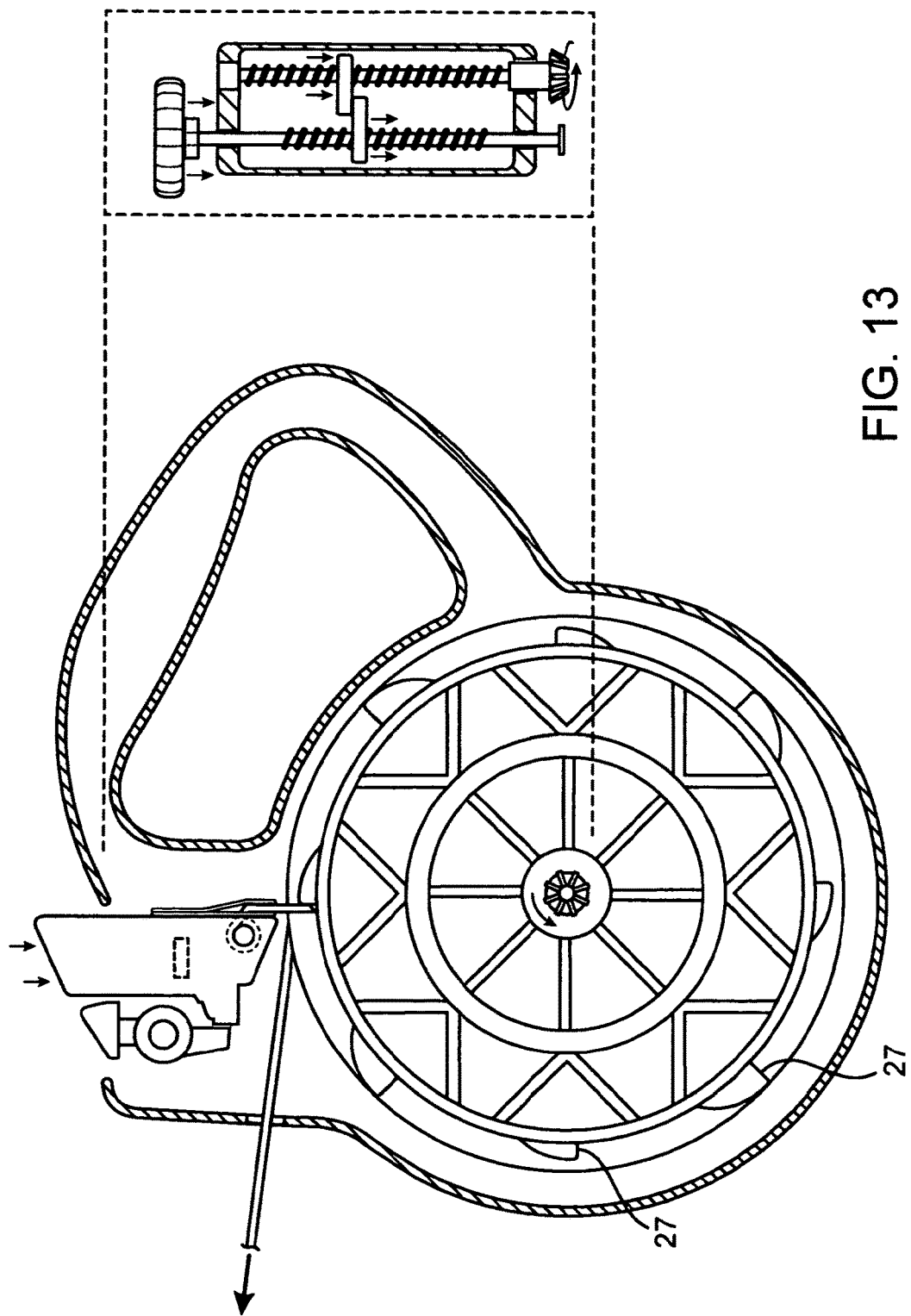
FIG. 13 is a plan view of components inside the housing shown in FIG. 1 with emphasis on the adjustable brake actuation system at the moment of brake and spool engagement and the cessation of spool rotation in the direction of leash extension.

In FIG. 11, as spool 28 in FIG. 2 rotates in the direction of leash extension 32 in FIG. 3, spool gear 30 rotates in the same direction which rotates gear 67 which is connected to auger 63 and directly drives auger 63. Brake actuator 69 is threaded and mounted to auger 63 in FIG. 9. As spool 28 in FIG. 2 rotates, auger 63 rotates causing brake actuator 69 in FIG. 9 to move in the direction indicated in FIG. 11. As auger 63 rotates in the direction indicated by the rotation of gear 67, brake actuator 69 moves along auger 63 in FIG. 9 until surface 72 makes contact with surface 71 in FIG. 11. As directional rotation continues from FIG. 11, FIG. 12 shows brake actuator 69 exerting force on setting stop 68 in the direction of the arrows which translates to moving dial auger 66, dial 18 and brake button 14 in FIG. 9 with pivot brake tip 11 in the direction of the arrows indicated. This force translation is moving brake button 14 with pivot brake tip 11 toward spool 28 in FIG. 2. As dial auger 66 moves, auger shaft 64 and auger shaft 65 in FIG. 9 move respectively through housing guides 70 and 61 in FIG. 12. FIG. 13 shows continued rotation from FIG. 12 with respective continued component movement until pivot brake tip 11 attached to brake button 14 is brought into position to engage one of the spool tooth braking surfaces 27 on spool 28. Pivot brake tip 11 rotates into position to prevent spool rotation in the direction of extension. Conversely, if after spool 28 in FIG. 2 is prevented from rotating in the direction of extension, leash retraction were to ensue, spool rotation would be in the opposite direction and brake actuator 69 in FIG. 9 would begin to move in the opposite direction than previously indicated and brake button 14 with pivot brake tip 11 would move out of position which had previously prevented rotation of spool 28 in FIG. 2.

Figure 14:
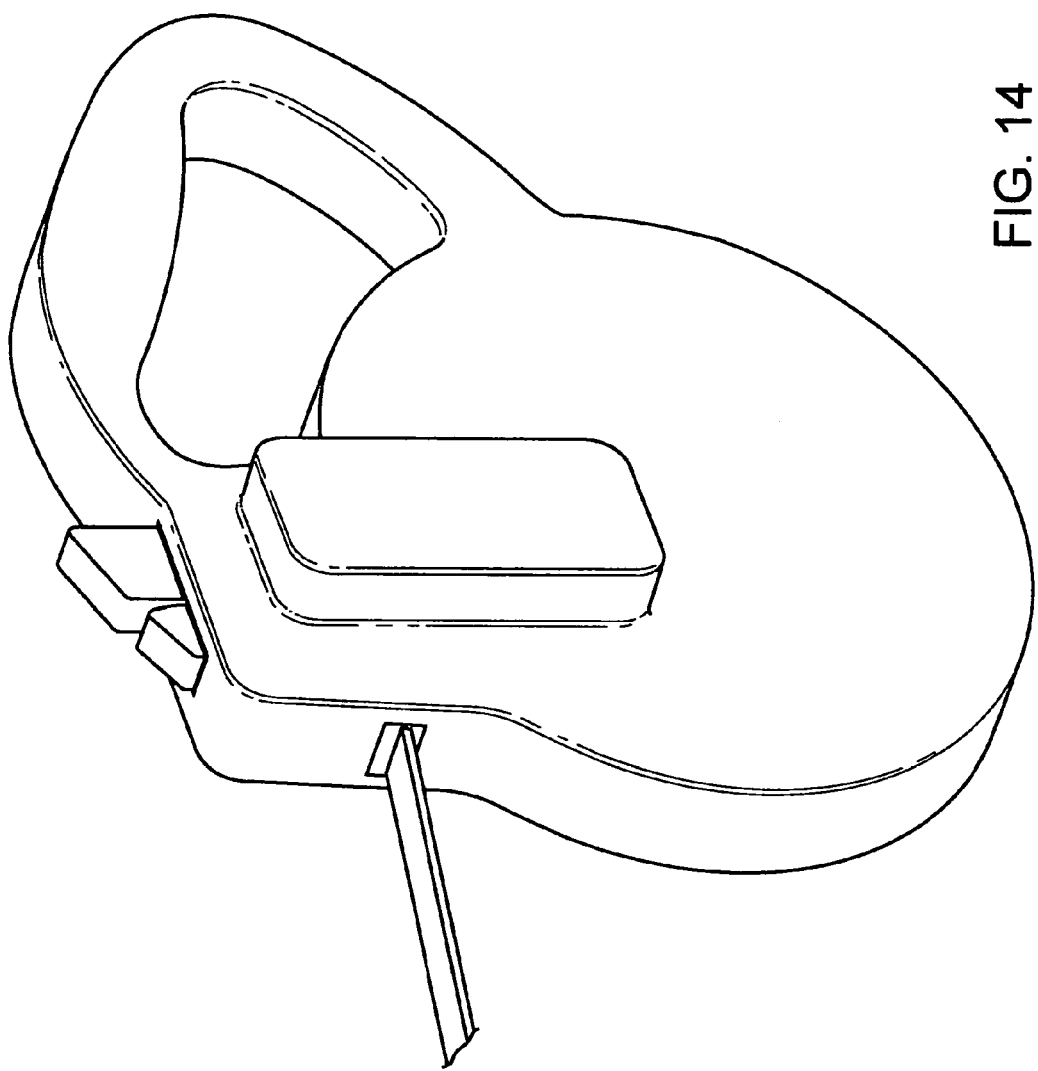
FIG. 14 is a perspective view of the exterior with the non-adjustable brake actuation system.
Figure 15:
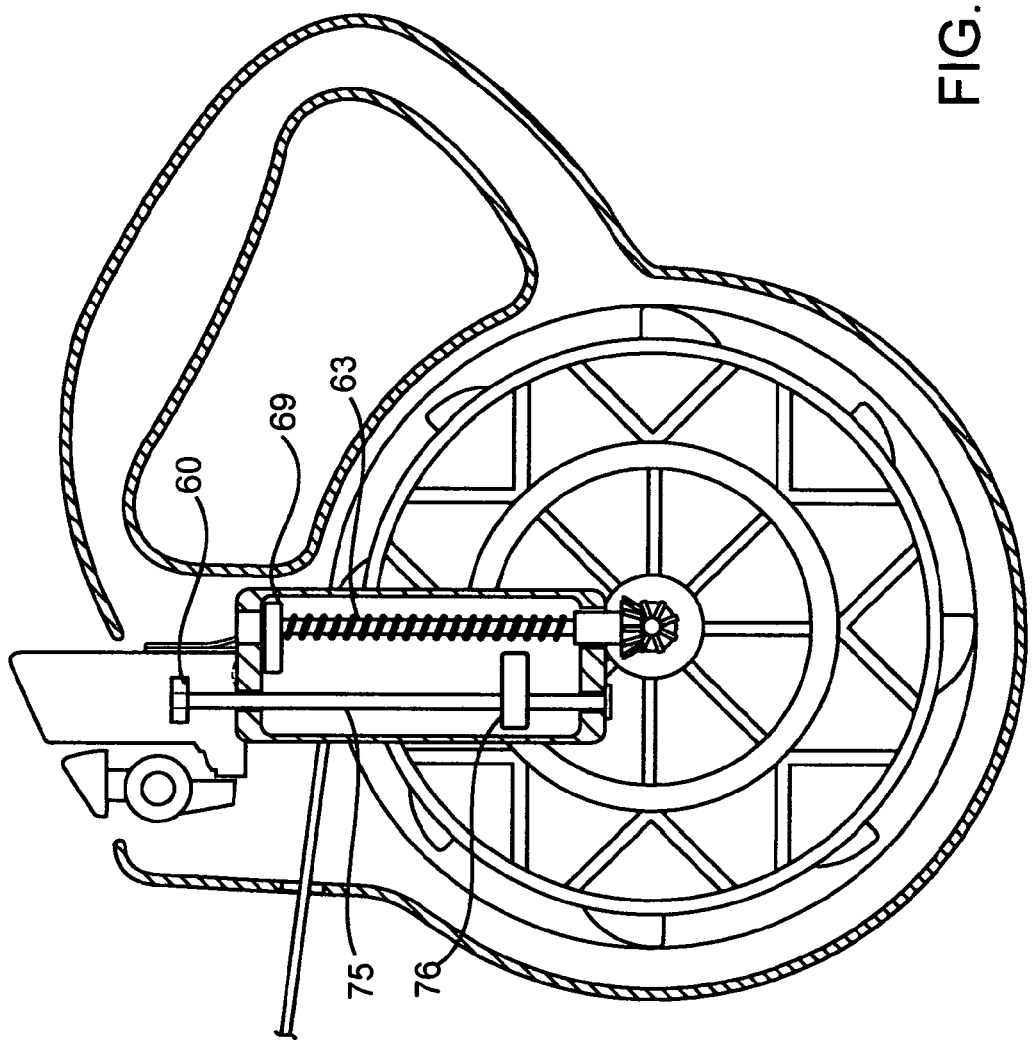
FIG. 15 is a plan view of components inside the housing shown in FIG. 14 with emphasis on the non-adjustable brake actuation system.
Figure 16:
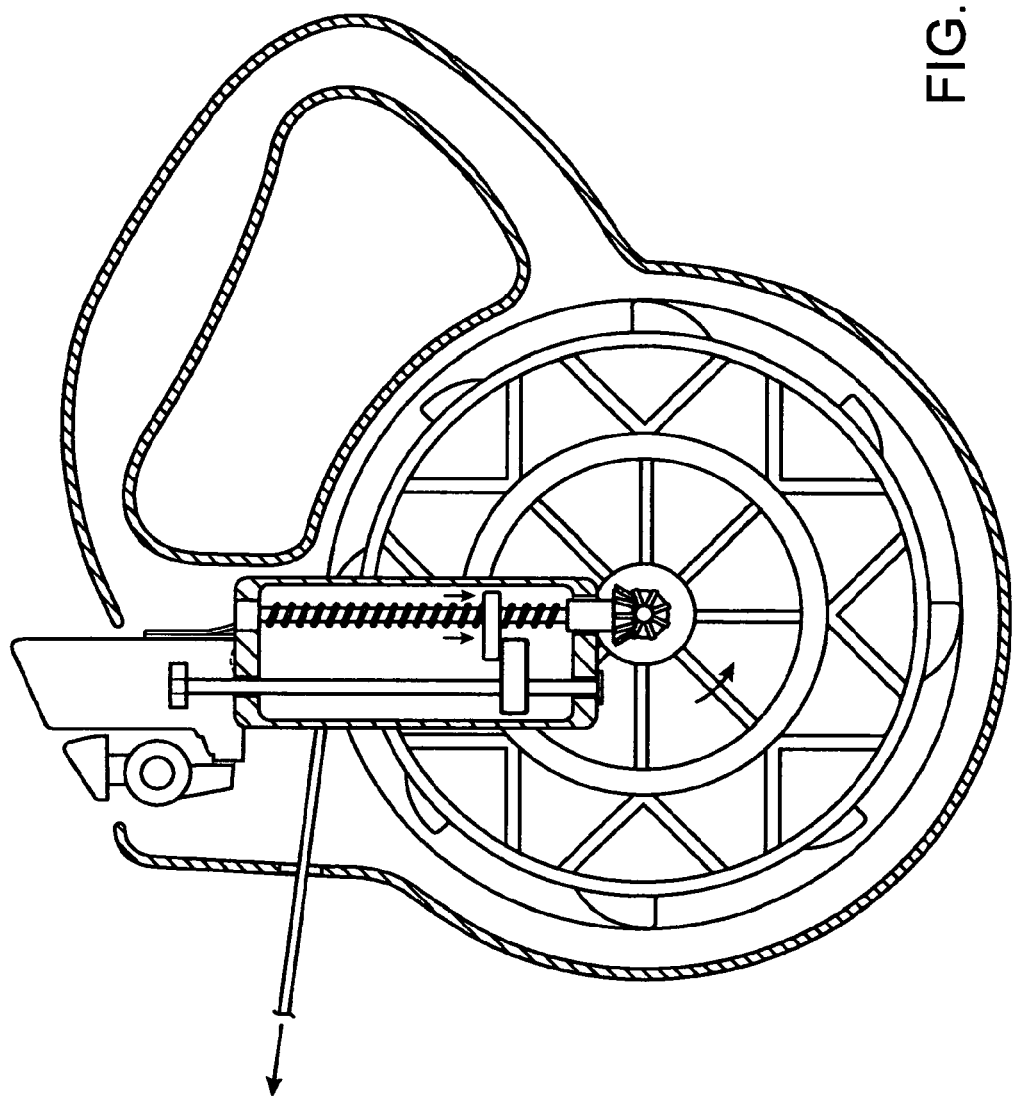
FIG. 16 is a plan view of components inside the housing shown in FIG. 14 with emphasis on the non-adjustable brake actuation system in motion toward leash extension and at the point of brake engagement.
Figure 17:
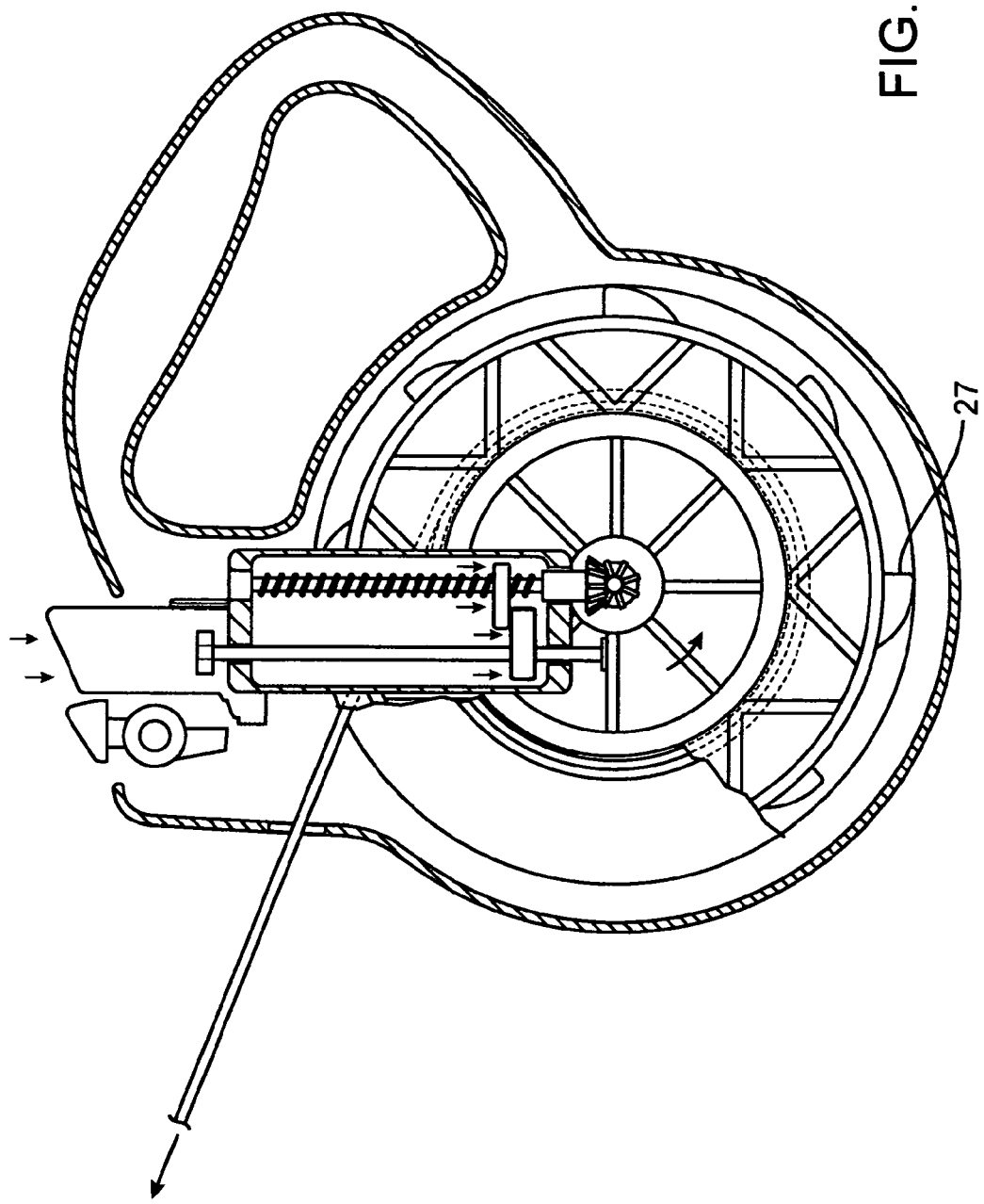
FIG. 17 is a plan view of components inside the housing shown in FIG. 14 with emphasis on the non-adjustable brake actuation system in motion at the moment of brake and spool engagement and the cessation of spool rotation in the direction of leash extension, and the leash length remaining on the spool.

FIGS. 14-17 are a series of views demonstrating operation elements of the non-adjustable brake actuation system. This design alternative has same operation principle as with the adjustable brake actuation system featured in FIGS. 9-13, but does not include an adjustment dial system. Instead, this design incorporates one preset for the maximum length leash 10 to extend from spool 28 in order to improve safety and product integrity by not allowing leash 10 in FIG. 2 to extend to its fastening point. The fastening point is a point of high stress and design weakness and product failure in other leashes. FIG. 14 shows the leash housing with no dial. The design can accommodate and utilize a meter, meter window, and meter guide, but they are not required for operation. In the non-adjustable brake actuation system. FIG. 15 shows shaft 75 without threads, since stop 76 is in a fixed position on shaft 75. As in the adjustable brake actuation system featured in FIGS. 9-13, brake actuator 69 travels along auger 63 in response to auger rotation featured in FIGS. 9-13. In FIG. 16, brake actuator 69 moves directionally as the arrows indicate in response to the indicated extension direction of rotation of spool 28 in FIG. 2. Upon contact from brake actuator 69 to stop 76 as brake actuator 69 continues movement in the direction indicated in FIGS. 16-17, stop 76 moves with brake actuator 69 which translates to movement of shaft 75, brake mount 60 in FIG. 15, brake button 14 with pivot brake tip 11. This results in pivot brake tip 11 engaging one of the spool teeth at its spool braking surface 27 in FIG. 2. FIG. 17 shows a cross section view of the leash 10 having remaining length wound around spool 28 at the point of maximum extension of leash 10 as controlled by the non-adjustable brake actuation system. As with the adjustable brake actuation system, the non-adjustable brake actuation system allows for complete manual brake button 14 activation and the operation of the brake lock 12 in FIG. 2.

Figure 18B:
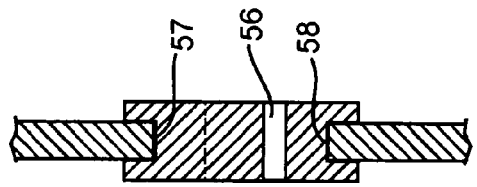
FIGS. 18A, 18B and 18C are cross section views of the moveable exit opening for the leash in the housing shown in FIG. 18.
Figure 18A:
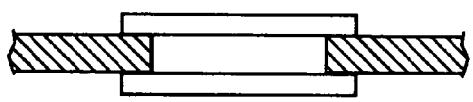
Figure 18C:
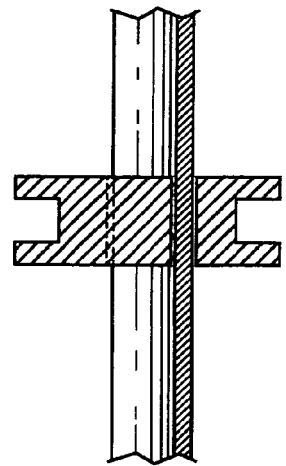
Figure 18:
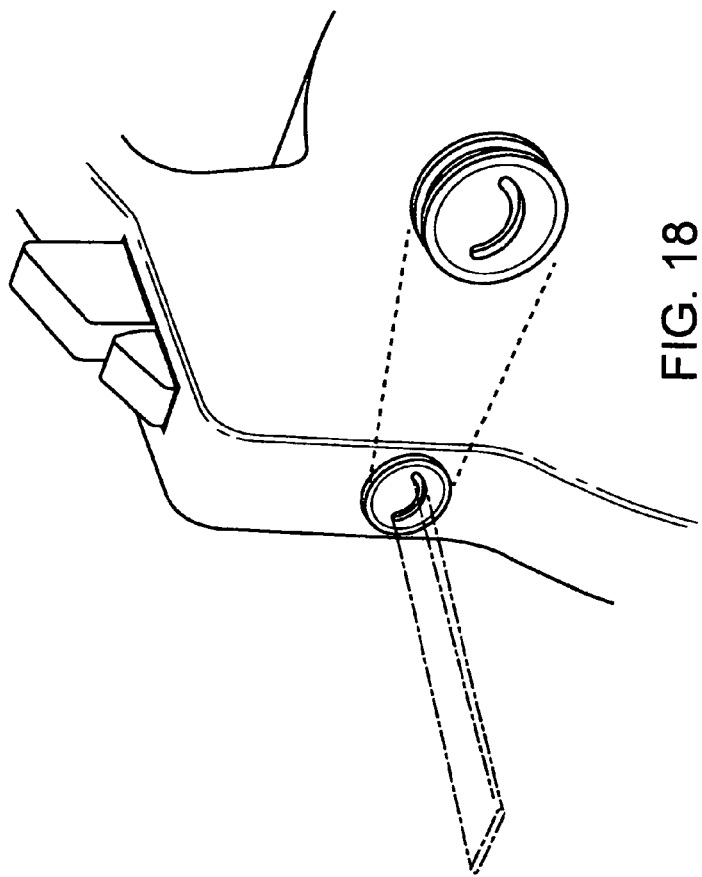
FIG. 18 is a perspective view of the moveable exit opening for the leash.
Figure 18F:
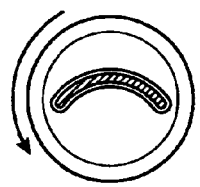
FIGS. 18D, 18E and 18F are plan views of the moveable exit opening for the leash with an emphasis on varied positions and movability.
Figure 18E:
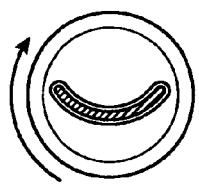
Figure 18D:
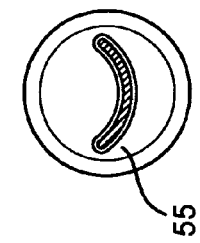

Normally, such leash assemblies equipped with a leash 10 in the shape of a strap have a leash dispenser 4 in FIG. 1 in the shape of a narrow rectangular slit which can be integrated into the housing as shown in FIG. 18 and through which a leash is guided to the outside. Leash dispensers often allow for the leash 10 to twist or fold when running in and out of the leash dispenser 4 which either winds improperly onto the spool 28 or can simply get stuck in the leash dispenser 4 in FIG. 1 so the automatic function can no longer be ensured. As shown in FIGS. 18D. 18E and 18F, the leash dispenser can move with the leash within a limited range of orientation to accommodate the tendency of the twisting or folding leash 10 and better guide the leash in through the leash dispenser 55 in FIG. 18D and back onto the spool 28 in FIG. 2 during retraction and out through leash dispenser 55 in FIG. 18D during leash extension. FIGS. 18A. 18B and 18C show cross section of leash dispenser 55 in FIG. 18D as it is mounted into, and is able to move in, leash housing 16 in FIG. 1. Leash dispenser stop 56 is able to move rotationally between housing stop 57 and housing stop 58 in FIG. 18B during rotation to turn leash dispenser 55 in FIG. 18D into the directional orientations shown in FIGS. 18D, 18E and 18F as needed.

Figure 19A:
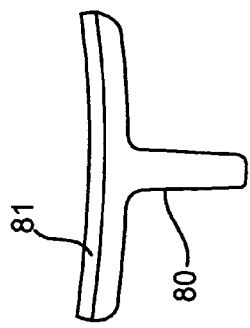
FIGS. 19, 19A and 19B are plan views of the adjustable handle grip and the system to affix accessories.
Figure 19B:
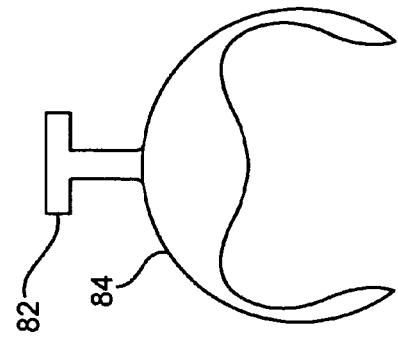
Figure 19:
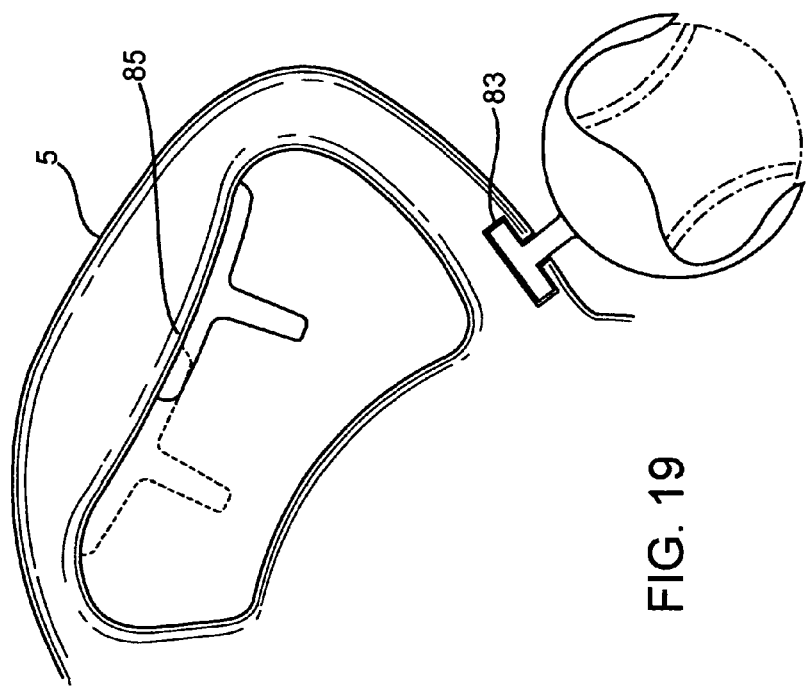

FIG. 19 depicts two handle features, an adjustable grip and an accessory clip system. Leash handle 5 needs to be designed to accommodate a variety of hand sizes. Other designs have attempted to address this problem with fixed ridges. This one size fits all approach does not work and results in discomfort for many whose hands are not compatibly sized. This also translates into a safety issue when a pet owner does not have a good grip on the leash handle 5. A pet can pull away and the pet owner can lose their grip and let go of the leash handle 5. By incorporating an adjustable grip guide 80 which can slide along an adjustment guide 81 which sits in handle guide receptacle 85, pet owners can customize the handle grip to fit any hand size. The adjustment guide 81 allows for comfort and delivers greater control and safety by positioning fingers in their best position to operate the manual brake 14, brake lock 12 in FIG. 2, and adjustment dial 18 in FIG. 9. The ease of positioning as indicated in FIG. 19 allows multiple pet owners of different hand sizes to share the product and maximize comfort, control and safety for each person.

The accessory clip system in FIG. 19A and FIG. 19B depict one of several systems to affix accessories to the handle or housing of a leash using a rigid lock system. In this depiction, leash handle 5 has a cut out accessory clip receptacle 83. Accessory clip connector 82 on clip 84 is formed to slide and lock into clip receptacle 83.

Figure 20B:
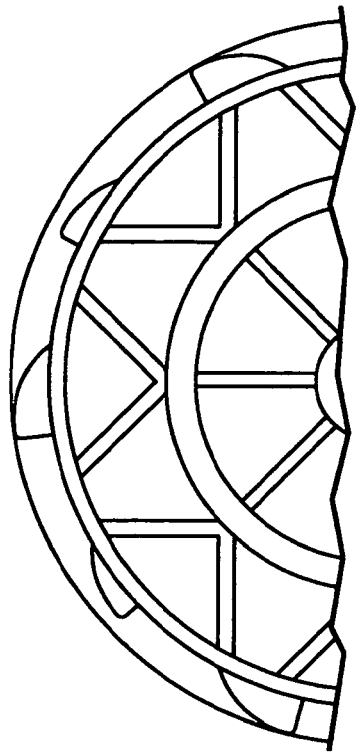
FIGS. 20A and 20B are plan views of sections of spools with varied teeth configurations as seen in FIG. 2.
Figure 20A:
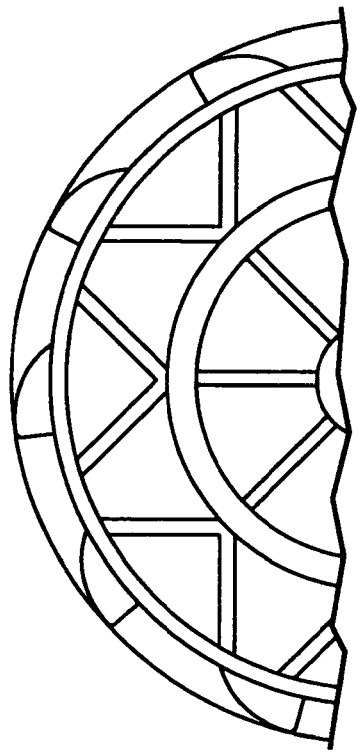

FIGS. 20A and 20B emphasize the teeth configuration on spools for leashes. FIG. 20A demonstrates a uniform tooth pattern found on other leashes. When a leash is being extended at a high rate of speed causing the spool to also turn at a high rate of speed, the uniform top surfaces of the teeth on the spool form a virtual smooth surface into which the brake tip is trying to penetrate during an attempt to engage the brake. The operator of the leash, upon trying to actuate the brake, often experiences skipping of the brake tooth across the top surfaces of the teeth as the brake tries to position itself between the teeth to stop rotation. Furthermore, a high vibration of the brake button results which is uncomfortable and may even cause the pet owner to drop the leash handle. There are both safety and comfort concerns as the leash cannot be stopped promptly and may even be released. FIG. 20B depicts spool teeth of varied sizes. By positioning one or more spool teeth of a varied size, shape, or position, the brake engages promptly, efficiently and smoothly because there is no longer a virtual uniform surface along the tops of the spool teeth when the spool is rotating at a high rate of speed. Brake tips of all designs benefit from this spool teeth configuration.

Although the present invention has been discussed in considerable detail with reference to certain preferred embodiments, other embodiments are possible. Therefore, the scope of the appended claims should not be limited to the description of preferred embodiments contained in this disclosure. All references cited herein are incorporated by reference in their entirety.

What is claimed is:

1. A retractable retention system comprising:
   a) a housing comprising an exterior surface;
   b) a handle having a length and coupled to the exterior surface of the housing, the handle comprising:
      i) an interior surface and an exterior surface;
      ii) a handle guide receptacle disposed along the interior surface of the handle;
      iii) an adjustment guide disposed within the handle guide receptacle; and
      iv) a slidable handle grip coupled to the adjustment guide and adapted to slide longitudinally along the length of the handle in a first direction or a second direction relative to the interior surface of the handle to create a gap between one side of the slidable handle grip and the interior surface of the handle and another gap between an opposite side of the slidable handle grip and the interior surface of the handle to accommodate different sized users' hands, variable sizes of each of the gaps being created without removing the handle from the housing;
   c) a cord comprising a proximal portion and a distal portion;
   d) a spool rotatably disposed within the housing such that the spool can rotate in either a first radial direction or a second radial direction, the spool being adapted to retain the cord, the proximal portion of the cord being coupled to the spool, the spool having an outer perimeter with a plurality of spaced apart teeth; and
   e) a braking system disposed within the housing and coupled to the spool to prevent the spool from rotating in the second direction.

2. The retractable retention system of claim 1, wherein the proximal portion of the cord is wound at least once around the spool.

3. The retractable retention system of claim 1, wherein the plurality of teeth vary in size, shape and spacing.

4. The retractable retention system of claim 1, wherein the plurality of teeth vary in size, shape or spacing.

5. The retractable retention system of claim 1, wherein the spool is freely rotatable in the first radial direction and wherein the braking system prevents the spool from rotating in the second radial direction.

6. The retractable retention system of claim 1, wherein the braking system comprises:
   a) a brake engagement element which is movably attached to the housing, the brake engagement element comprising an exterior portion and an interior portion; and
   b) a brake insert, the brake insert having a base portion and a brake tip portion, the base portion being rotatably coupled to the interior portion of the brake engagement element such that the brake tip portion can be rotated bi-directionally between a first position, a second position, and a third position, the second position being between the first position and the third position, the brake tip portion being biased to the second position, the brake insert being adapted such that the brake tip portion can be inserted between the plurality of spaced apart teeth to prevent the rotation of the spool in the second radial direction.

7. The retractable retention system of claim 6 further comprising an adjustable brake actuation system, the adjustable brake actuation system comprising:
   a) an adjustment auger rotatably coupled to the brake engagement element, the adjustment auger being capable of alternatively moving relative to the housing in a first adjustment auger linear direction to move the brake tip portion to between the plurality of spaced apart teeth and a second adjustment auger linear direction to move the brake tip portion away from between the plurality of spaced apart teeth, the adjustment auger being biased in the second adjustment auger linear direction;
   b) a rotatable adjustment dial coupled to the adjustment auger such that the rotation of the adjustment dial in a first adjustment dial radial direction rotates the adjustment auger in a first adjustment auger radial direction and the rotation of the adjustment dial in a second adjustment dial radial direction rotates the adjustment auger in a second adjustment auger radial direction;

c) a stop threadably attached to the adjustment auger such that the rotation of the adjustment auger in the first adjustment auger radial direction causes the stop to travel along the adjustment auger in a first stop linear direction, and the rotation of the adjustment auger in the second adjustment auger radial direction causes the stop to travel along the adjustment auger in a second stop linear direction; and d) a brake actuation auger operatively coupled to the spool such that the rotation of the spool in the spool first radial direction causes the brake actuation auger to rotate in a first brake actuation auger radial direction, and the rotation of the spool in the spool second radial direction causes the brake actuation auger to rotate in a second brake actuation auger radial direction, the brake actuation auger comprising a brake actuator threaded onto the brake actuation auger such that the rotation of the brake actuation auger in the first brake actuation auger radial direction causes the brake actuator to travel in a first brake actuator linear direction and such that the rotation of the brake actuation auger in the second brake actuation auger radial direction causes the brake actuator to travel in a second brake actuator linear direction, the traveling of the brake actuator in the second brake actuator linear direction causes the brake actuator to eventually contact the stop, and continued traveling of the brake actuator in the second brake actuator linear direction causes the brake actuator to push the stop and the adjustment auger in the first adjustment auger linear direction to move the brake tip portion to between the plurality of spaced apart teeth, and the traveling of the brake actuator in the first brake actuator linear direction causes the brake actuator to move away from the stop to allow the adjustment auger to travel in the second adjustment auger linear direction and move the brake tip portion from between the plurality of spaced apart teeth.

8. The retractable retention system of claim 1, wherein the handle guide receptacle comprises an opening and the adjustment guide comprises an extension configured for disposition in and sliding along the opening.

9. A retractable retention system comprising:
a) a housing;
b) a handle coupled to the housing, the handle comprising:
   i) an interior surface and an exterior surface;
   ii) a handle guide receptacle disposed along the interior surface of the handle;
   iii) an adjustment guide disposed within the handle guide receptacle; and
   iv) a slidable handle grip coupled to the adjustment guide and adapted to slide longitudinally along the length of the handle in a first direction or a second direction relative to the interior surface of the handle to create a gap between one side of the slidable handle grip and the interior surface of the handle and another gap between an opposite side of the slidable handle grip and the interior surface of the handle to accommodate different sized users' hands, variable sizes of each of the gaps being created without removing the handle from the housing;
c) a spool rotatably disposed within the housing such that the spool can rotate in either a first radial direction or a second radial direction, the spool having an outer perimeter with a plurality of spaced apart teeth; and
d) a braking system disposed within the housing and coupled to the spool to prevent the spool from rotating in the second direction.

10. The retractable retention system of claim 9, wherein the spool is freely rotatable in the first direction and wherein the braking system prevents the spool from rotating in the second direction.

11. The retractable retention system of claim 9, wherein the plurality of teeth vary in size, shape and spacing.

12. The retractable retention system of claim 9, wherein the plurality of teeth vary in size, shape or spacing.

13. The retractable retention system of claim 9, wherein the braking system comprises:
a) a brake engagement element which is movably attached to the housing, the brake engagement element comprising an exterior portion and an interior portion; and
b) a brake insert, the brake insert having a base portion and a brake tip portion, the base portion being rotatably coupled to the interior portion of the brake engagement element such that the brake tip portion can be rotated bi-directionally between a first position, a second position, and a third position, the second position being between the first position and the third position, the brake tip portion being biased to the second position, the brake insert being adapted such that the brake tip portion can be inserted between the plurality of spaced apart teeth to prevent the rotation of the spool in the second radial direction.

14. The retractable retention system of claim 13 further comprising an adjustable brake actuation system, the adjustable brake actuation system comprising:
a) an adjustment auger rotatably coupled to the brake engagement element, the adjustment auger being capable of alternatively moving relative to the housing in a first adjustment auger linear direction to move the brake tip portion to between the plurality of spaced apart teeth and a second adjustment auger linear direction to move the brake tip portion away from between the plurality of spaced apart teeth, the adjustment auger being biased in the second adjustment auger linear direction;
b) a rotatable adjustment dial coupled to the adjustment auger such that the rotation of the adjustment dial in a first adjustment dial radial direction rotates the adjustment auger in a first adjustment auger radial direction and the rotation of the adjustment dial in a second adjustment dial radial direction rotates the adjustment auger in a second adjustment auger radial direction;
c) a stop threadably attached to the adjustment auger such that the rotation of the adjustment auger in the first adjustment auger radial direction causes the stop to travel along the adjustment auger in a first stop linear direction, and the rotation of the adjustment auger in the second adjustment auger radial direction causes the stop to travel along the adjustment auger in a second stop linear direction; and
d) a brake actuation auger operatively coupled to the spool such that the rotation of the spool in the first spool radial direction causes the brake actuation auger to rotate in a first brake actuation auger radial direction, and the rotation of the spool in the second spool radial direction causes the brake actuation auger to rotate in a second brake actuation auger radial direction, the brake actuation auger comprising a brake actuator threaded onto the brake actuation auger such that the rotation of the brake actuation auger in the first brake actuation auger radial direction causes the brake actuator to travel in a first brake actuator linear direction and such that the rotation of the brake actuation auger in the second brake actuation auger radial direction causes the brake actuator to travel in a second brake actuator linear direction, the traveling of the brake actuator in the second brake actuator linear direction causes the brake actuator to eventually contact the stop, and continued traveling of the brake actuator in the second brake actuator linear direction causes the brake actuator to push the stop and the adjustment auger in the first adjustment auger linear direction to move the brake tip portion to between the plurality of spaced apart teeth, and the traveling of the brake actuator in the first brake actuator linear direction causes the brake actuator to move away from the stop to allow the adjustment auger to travel in the second adjustment auger linear direction and move the brake tip portion from between the plurality of spaced apart teeth.

15. The retractable retention system of claim 9, wherein the handle guide receptacle comprises an opening and the adjustment guide comprises an extension configured for disposition in and sliding along the opening.

16. A retractable retention system comprising:
a) a housing;
b) a handle coupled to the housing, the handle comprising:
   i) an interior surface and an exterior surface;
   ii) a handle guide receptacle disposed along the interior surface of the handle;
   iii) an adjustment guide disposed within the handle guide receptacle; and
   iv) a slidable handle grip coupled to the adjustment guide and adapted to slide longitudinally along the length of the handle in a first direction or a second direction relative to the interior surface of the handle to create a gap between one side of the slidable handle grip and the interior surface of the handle and another gap between an opposite side of the slidable handle grip and the interior surface of the handle to accommodate different sized users' hands, variable sizes of each of the gaps being created without removing the handle from the housing;
c) a cord comprising a proximal portion and a distal portion;
d) a spool rotatably disposed within the housing such that the spool can rotate in either a first radial direction or a second radial direction, the spool being adapted to retain the cord, the spool having an outer perimeter with a plurality of spaced apart teeth; and
e) a braking system disposed within the housing to prevent the spool from rotating in the second direction.

17. The retractable retention system of claim 16, wherein the braking system comprises:
a) a brake engagement element which is movably attached to the housing, the brake engagement element comprising an exterior portion and an interior portion; and
b) a brake insert, the brake insert having a base portion and a brake tip portion, the base portion being rotatably coupled to the interior portion of the brake engagement element such that the brake tip portion can be rotated bi-directionally between a first position, a second position, and a third position, the second position being between the first position and the third position, the brake tip portion being biased to the second position, the brake insert being adapted such that the brake tip portion can be inserted between the plurality of spaced apart teeth to prevent the rotation of the spool in the second radial direction.

18. The retractable retention system of claim 17 further comprising an adjustable brake actuation system, the adjustable brake actuation system comprising:
a) an adjustment auger rotatably coupled to the brake engagement element, the adjustment auger being capable of alternatively moving relative to the housing in a first adjustment auger linear direction to move the brake tip portion to between the plurality of spaced apart teeth and a second adjustment auger linear direction to move the brake tip portion away from between the plurality of spaced apart teeth, the adjustment auger being biased in the second adjustment auger linear direction;
b) a rotatable adjustment dial coupled to the adjustment auger such that the rotation of the adjustment dial in a first adjustment dial radial direction rotates the adjustment auger in a first adjustment auger radial direction and the rotation of the adjustment dial in a second adjustment dial radial direction rotates the adjustment auger in a second adjustment auger radial direction;
c) a stop threadably attached to the adjustment auger such that the rotation of the adjustment auger in the first adjustment auger radial direction causes the stop to travel along the adjustment auger in a first stop linear direction, and the rotation of the adjustment auger in the second adjustment auger radial direction causes the stop to travel along the adjustment auger in a second stop linear direction; and
d) a brake actuation auger operatively coupled to the spool such that the rotation of the spool in the first spool radial direction causes the brake actuation auger to rotate in a first brake actuation auger radial direction, and the rotation of the spool in the second spool radial direction causes the brake actuation auger to rotate in a second brake actuation auger radial direction, the brake actuation auger comprising a brake actuator threaded onto the brake actuation auger such that the rotation of the brake actuation auger in the first brake actuation auger radial direction causes the brake actuator to travel in a first brake actuator linear direction and such that the rotation of the brake actuation auger in the second brake actuation auger radial direction causes the brake actuator to travel in a second brake actuator linear direction, the traveling of the brake actuator in the second brake actuator linear direction causes the brake actuator to eventually contact the stop, and continued traveling of the brake actuator in the second brake actuator linear direction causes the brake actuator to push the stop and the adjustment auger in the first adjustment auger linear direction to move the brake tip portion to between the plurality of spaced apart teeth, and the traveling of the brake actuator in the first brake actuator linear direction causes the brake actuator to move away from the stop to allow the adjustment auger to travel in the second adjustment auger linear direction and move the brake tip portion from between the plurality of spaced apart teeth.

19. The retractable retention system of claim 16, wherein the handle guide receptacle comprises an opening and the adjustment guide comprises an extension configured for disposition in and sliding along the opening.

* * * * *